US012211087B2

(12) United States Patent
Sugiyama

(10) Patent No.: US 12,211,087 B2
(45) Date of Patent: Jan. 28, 2025

(54) SALES MANAGEMENT DEVICE AND CONTROL METHOD THEREOF

(71) Applicant: TOSHIBA TEC KABUSHIKI KAISHA, Tokyo (JP)

(72) Inventor: Hideaki Sugiyama, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 17/571,164

(22) Filed: Jan. 7, 2022

(65) Prior Publication Data
US 2022/0327604 A1 Oct. 13, 2022

(30) Foreign Application Priority Data

Apr. 13, 2021 (JP) ................................. 2021-067628

(51) Int. Cl.
*G06Q 30/0601* (2023.01)
*G06Q 20/32* (2012.01)
(Continued)

(52) U.S. Cl.
CPC ..... *G06Q 30/0637* (2013.01); *G06Q 20/3276* (2013.01); *G06Q 30/0281* (2013.01); *H04W 4/025* (2013.01)

(58) Field of Classification Search
CPC .......... G06Q 30/0637; G06Q 30/0281; G06Q 20/40; G06Q 20/4015; G06Q 20/4093; G06Q 30/015
See application file for complete search history.

(56) References Cited

U.S. PATENT DOCUMENTS

| 7,416,117 B1* | 8/2008 | Morrison .................. A47F 9/04 235/383 |
| 2015/0032557 A1* | 1/2015 | Suzuki ................. G07G 1/0018 705/16 |

(Continued)

FOREIGN PATENT DOCUMENTS

JP 2019-053735 A 4/2019

OTHER PUBLICATIONS

RoboSystems Inc Applies for Patent on Personal Shopping Assistant. Global IP News. Business and Commerce Patent News [New Delhi] Oct. 15, 2020. (Year: 2020).*

*Primary Examiner* — Michael Misiaszek
(74) *Attorney, Agent, or Firm* — FOLEY & LARDNER LLP

(57) ABSTRACT

A sales management device includes a communication interface and a processor. The communication interface is configured to communicate with a mobile terminal on which a user registers purchases and a clerk terminal within a store. The processor is configured to acquire terminal identification information set for the mobile terminal, acquire status information indicating an operating status of the mobile terminal identified by the terminal identification, acquire a communication connection state of the mobile terminal, and outputs the terminal identification information to the clerk terminal in response to (i) the communication connection state of the mobile terminal being unconnected and (ii) the status information of the mobile terminal acquired before the communication connection state of the mobile terminal becoming unconnected indicating a non-checkout status.

17 Claims, 26 Drawing Sheets

(51) Int. Cl.
  *G06Q 30/02*  (2023.01)
  *H04W 4/02*  (2018.01)

(56) References Cited

U.S. PATENT DOCUMENTS

| | | | |
|---|---|---|---|
| 2016/0098697 A1* | 4/2016 | Dunsmore | G06F 11/3636 |
| | | | 705/39 |
| 2017/0236189 A1* | 8/2017 | Srinath | G06Q 30/0635 |
| | | | 705/26.81 |
| 2020/0201703 A1* | 6/2020 | Marquez | G07G 1/0036 |
| 2021/0027267 A1* | 1/2021 | Hasegawa | G06Q 20/20 |
| 2021/0150505 A1* | 5/2021 | Kumagawa | G06Q 30/06 |

* cited by examiner

*FIG. 22*

| TERMINAL CODE | | 001 |
|---|---|---|
| CURRENT DATE AND TIME DT | STATUS ST | LOCATION INFORMATION LO |
| | | |
| | | |
| | | |
| ⋮ | ⋮ | ⋮ |

231

SALES MANAGEMENT DEVICE AND CONTROL METHOD THEREOF

CROSS-REFERENCE TO RELATED APPLICATION

This application is based upon and claims the benefit of priority from Japanese Patent Application No. 2021-067628, filed on Apr. 13, 2021, the entire contents of which are incorporated herein by reference.

FIELD

Embodiments described herein relate generally to a sales management device and a control method thereof.

BACKGROUND

In recent years, various store systems have been devised in which customers use mobile terminals (smartphones, cart terminals, and the like) to perform from the registration to the checkout of purchased commodities by themselves when buying around at the store's sales floor. In such a store system, a customer who uses a mobile terminal, a so-called user, operates the mobile terminal, and the user themselves checks out purchased commodities. Therefore, there is a concern that the user may take out the purchased commodity whose checkout has not been completed from the store.

DESCRIPTION OF THE DRAWINGS

FIG. 22 is a schematic diagram showing an example of a time series buffer in a second embodiment.

DETAILED DESCRIPTION

Embodiments of the present disclosure provide a sales management device and a control method thereof that can appropriately deal with an act of a user taking out the purchased commodities whose checkout was not completed from a store.

In general, according to one embodiment, the sales management device includes a communication unit, a first acquisition unit, a second acquisition unit, a third acquisition unit, and an output unit. The communication unit communicates with a mobile terminal on which a user registers purchases. The first acquisition unit acquires terminal identification information set for the mobile terminal. The second acquisition unit acquires status information indicating the operating state of the mobile terminal identified by the terminal identification information acquired by the first acquisition unit. The third acquisition unit acquires the communication connection state of the mobile terminal. The output unit outputs the terminal identification information acquired by the first acquisition unit to the clerk terminal possessed by the clerk if the communication connection state of the mobile terminal acquired by the third acquisition unit is unconnected and the status information of the mobile terminal acquired by the second acquisition unit before the communication connection state of the mobile terminal becomes unconnected is a state indicating non-checkout.

Hereinafter, each embodiment will be described with reference to the drawings.

First Embodiment

Figure 1:
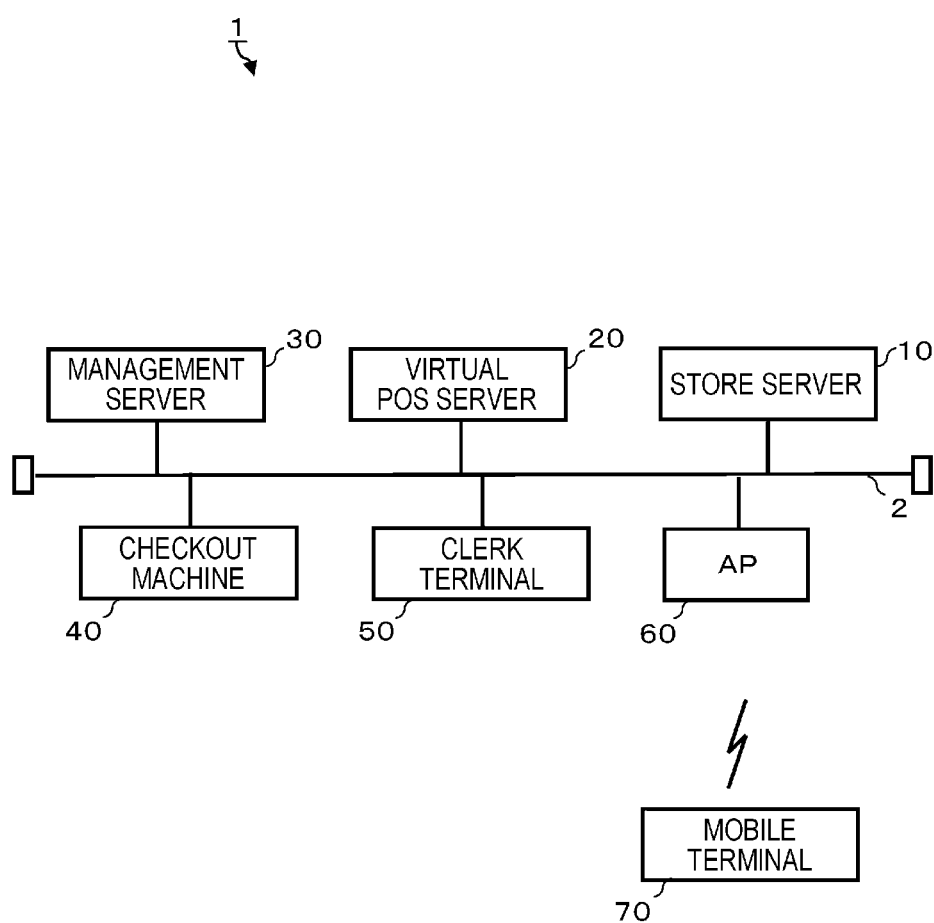
FIG. 1 is a block diagram showing a schematic configuration of a sales management system according to an embodiment.

FIG. 1 is a block diagram showing a schematic configuration of a sales management system 1 according to an embodiment.

The sales management system 1 includes a store server 10, a virtual POS server 20, a management server 30, a checkout machine 40, a clerk terminal 50, an access point 60, and a mobile terminal 70. The store server 10, the virtual POS server 20, the management server 30, the checkout machine 40, the clerk terminal 50, and the access point 60 are connected to a network 2 such as a local area network (LAN). The mobile terminal 70 includes a wireless unit 76 (see FIG. 2). The mobile terminal 70 wirelessly communicates with the access point 60. The access point 60 relays communication between each device connected to the network 2, that is, the store server 10, the virtual POS server 20, the management server 30, the checkout machine 40, and the clerk terminal 50, and the mobile terminal 70. Although only one access point 60 is shown in FIG. 1, there may be two or more access points 60 depending on the size of the store and the like.

The store server 10 manages a commodity database. The commodity database stores commodity data records that describe data on commodities sold in stores. The commodity data record includes items such as a commodity code, a commodity name, and a price. The commodity code is commodity identification information set for each commodity in order to individually identify the commodity. Each commodity is usually accompanied by a barcode indicating the commodity code.

The virtual POS server 20 cooperates with the mobile terminal 70 to operate the mobile terminal 70 to implement the function of a POS terminal. The virtual POS server 20 is an example of a sales management device.

The management server 30 manages the communication connection state of the mobile terminal 70 in which the mobile terminal 70 communicates with the sales management system 1. The management server 30 manages, for example, whether the mobile terminal 70 is connected to a wireless LAN or the like in the store. The wireless LAN conforms to, for example, the Wi-Fi (registered trademark) standard.

The checkout machine 40 is a device that enables a clerk or a user to check out purchased commodities. The number of checkout machines 40 is not particularly limited.

The clerk terminal 50 is typically owned by a clerk. Alternatively, the clerk terminal 50 is installed in the store or the like for the clerk to operate. The clerk terminal 50 is, for example, a smartphone, a tablet terminal, a personal computer (PC), or a dedicated terminal device.

The mobile terminal 70 is a device that enables the user to input data related to the registration of a commodity to be purchased, a so-called purchased commodity by themselves. The mobile terminal 70 is a portable communication terminal. The mobile terminal 70 is, for example, a smartphone, a tablet terminal, or the like equipped with a digital camera owned by the user. At the store, for example, the mobile terminal 70 may be rented out to a user who is a shopper. The mobile terminal 70 may be installed in a shopping cart, for example. The mobile terminal 70 includes at least hardware for reading a data code such as a barcode or a two-dimensional code.

Figure 2:
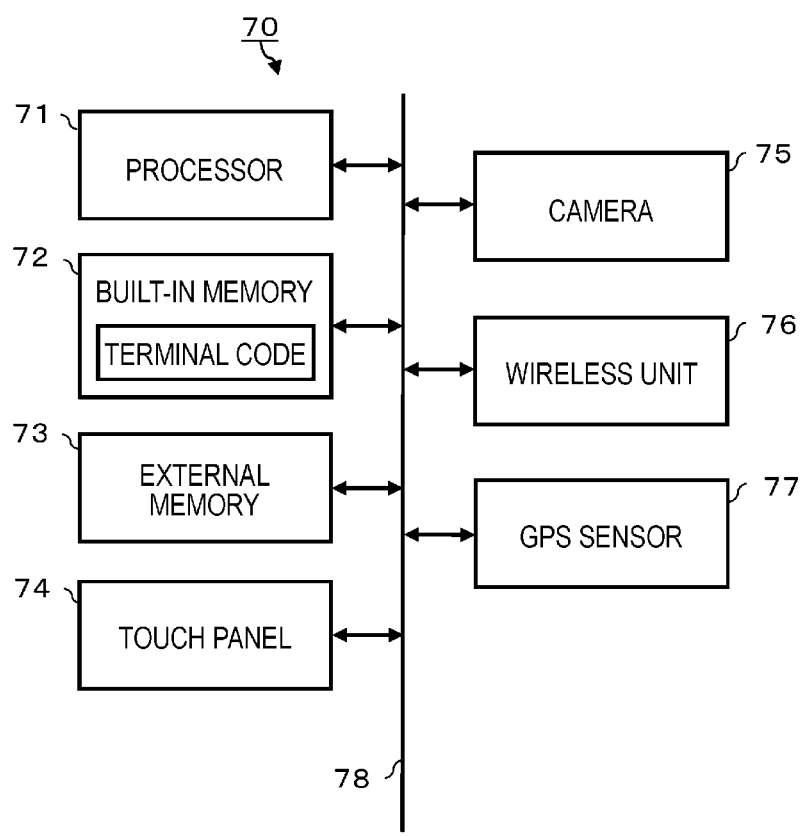
FIG. 2 is a block diagram showing a circuit configuration of a mobile terminal.

FIG. 2 is a block diagram showing a circuit configuration of the mobile terminal 70. As shown in FIG. 2, the mobile terminal 70 includes a processor 71, a built-in memory 72, an external memory 73, a touch panel 74, a camera 75, the wireless unit 76 (a communications interface, a transceiver), a global positioning system (GPS) sensor 77, and a system transmission line 78. The system transmission line 78 includes an address bus, a data bus, a control signal line, and the like. The mobile terminal 70 connects the processor 71, the built-in memory 72, the external memory 73, the touch panel 74, the camera 75, the wireless unit 76, and the GPS sensor 77 to the system transmission line 78. Then, the processor 71, the internal memory 72, and the external memory 73 are connected by the system transmission line 78 to form a computer that performs information processing for controlling the mobile terminal 70.

The processor 71 corresponds to the central portion of the computer. The processor 71 controls each unit in order to implement various functions as the mobile terminal 70 according to the operating system or the application program. The processor 71 is, for example, a central processing unit (CPU).

The built-in memory 72 corresponds to the main memory portion of the computer. The built-in memory 72 includes a non-volatile memory area and a volatile memory area. The built-in memory 72 stores an operating system or an application program in a non-volatile memory area. The built-in memory 72 stores data necessary for the processor 71 to execute a process for controlling each unit in a volatile memory area. The built-in memory 72 uses the volatile memory area as a work area where data is appropriately rewritten by the processor 71. The non-volatile memory area is, for example, a read only memory (ROM). The volatile memory area is, for example, a random access memory (RAM).

The external memory 73 corresponds to the auxiliary storage portion of the computer. For example, a secure digital (SD) memory card, a universal serial bus (USB) memory, or the like can be the external memory 73. The external memory 73 stores data used by the processor 71 to perform various processes, data created by the processes of the processor 71, and the like. The external memory 73 may store the above application program.

The application program stored in the external memory 73 includes a shopping application program. Hereinafter, the shopping application program is abbreviated as a shopping application. The shopping application is an application executed when shopping at a store where the sales management system 1 is introduced. The method of installing the shopping application in the external memory 73 is not particularly limited. The control program can be recorded on a removable recording medium, or the control program can be distributed by communication via a network and installed in the external memory 73. The recording medium may be in any form as long as the medium can store a program and can be read by the device, such as a CD-ROM or a memory card. The shopping application may be installed in the internal memory 72 instead of the external memory 73.

The touch panel 74 is a device that includes both an input device and a display device of the mobile terminal 70. The touch panel 74 detects the touch position with respect to the displayed image and outputs the touch position information to the processor 71.

The camera 75 is an imaging device built into the mobile terminal 70. The camera 75 operates as an imaging device for a still image or moving image or as a scanning device of a data code such as a barcode or a two-dimensional code by a shopping application installed on the mobile terminal 70.

The wireless unit 76 wirelessly communicates data with the access point 60 according to the wireless communication protocol.

The GPS sensor 77 positions the current position (latitude and longitude) of the mobile terminal 70 using a global positioning system (GPS).

The mobile terminal 70 stores the terminal code in the non-volatile memory area of the built-in memory 72. The terminal code is terminal identification information set for each mobile terminal 70 in order to individually identify each mobile terminal 70.

Figure 3:
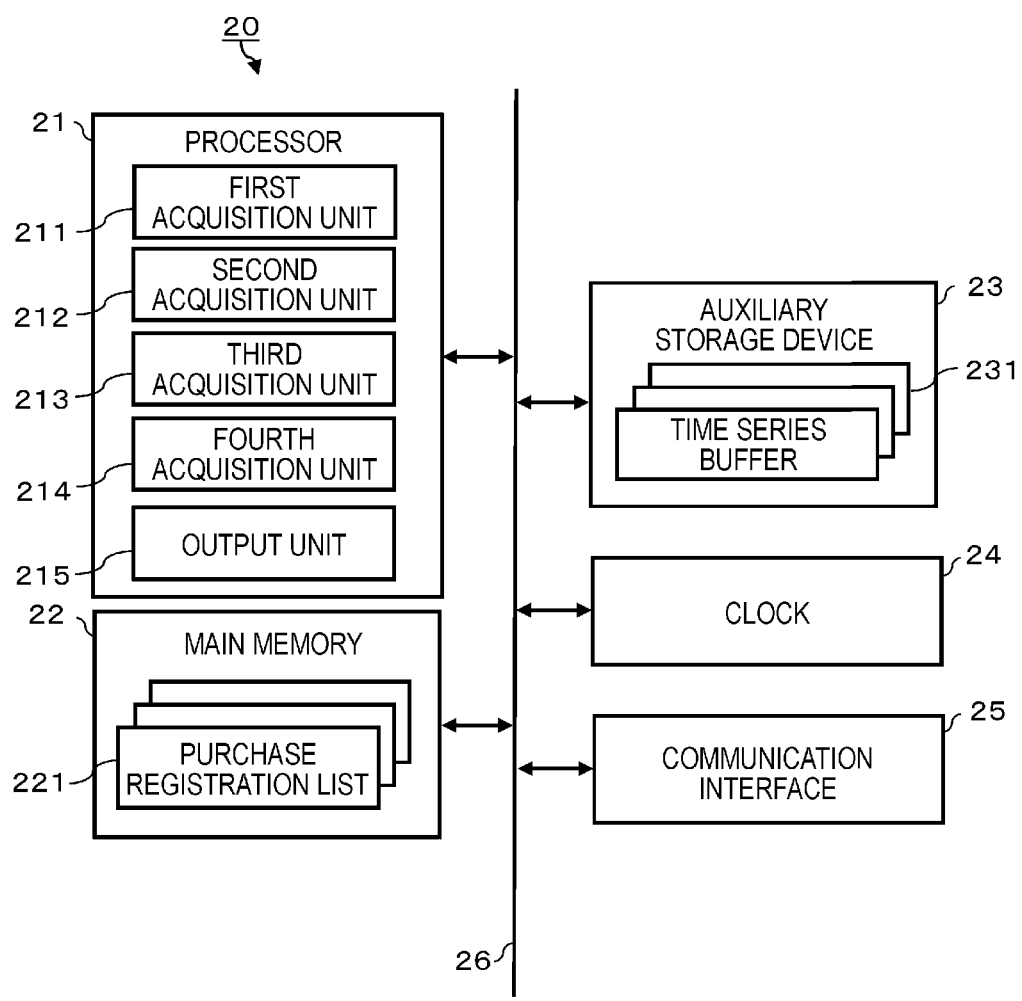
FIG. 3 is a block diagram showing a circuit configuration of a virtual point-of-sale (POS) server.

FIG. 3 is a block diagram showing a circuit configuration of the virtual POS server 20. The virtual POS server 20 includes a processor 21, a main memory 22, an auxiliary storage device 23, a clock 24, a communication interface 25, and a system transmission line 26. The system transmission line 26 includes an address bus, a data bus, a control signal line, and the like. The virtual POS server 20 connects the processor 21, the main memory 22, the auxiliary storage device 23, the clock 24, and the communication interface 25 to the system transmission line 26. In the virtual POS server 20, a computer is configured by the processor 21, the main memory 22, the auxiliary storage device 23, and the system transmission line 26 connecting the above.

The processor 21 corresponds to the central portion of the computer. The processor 21 controls each unit in order to implement various functions as the virtual POS server 20 according to the operating system or the application program. The processor 21 is, for example, a CPU.

The main memory 22 corresponds to the main memory portion of the computer. The main memory 22 includes a non-volatile memory area and a volatile memory area. The main memory 22 stores an operating system or an application program in a non-volatile memory area. The main memory 22 may store data necessary for the processor 21 to execute a process for controlling each unit in a non-volatile or volatile memory area. The main memory 22 uses a volatile memory area as a work area where data is appropriately rewritten by the processor 21.

The non-volatile memory area is, for example, a ROM. The volatile memory area is, for example, a RAM.

The auxiliary storage device 23 corresponds to the auxiliary storage portion of the computer. For example, an electronic erasable programmable read-only memory (EEPROM) (registered trademark), a hard disk drive (HDD), a solid state drive (SSD), or the like can be the auxiliary storage device 23. The auxiliary storage device 23 stores data used by the processor 21 to perform various processes, data created by the processes of the processor 21, and the like. The auxiliary storage device 23 may store the above application program.

The clock 24 functions as a time information source for the virtual POS server 20. The processor 21 tracks the current date and time based on the time information measured by the clock 24.

The communication interface 25 is connected to the network 2. The communication interface 25 performs data communication with another device connected via the network 2 according to a communication protocol. The communication interface 25 functions as a communication unit. The communication unit communicates with the mobile terminal 70 on which the user registers for purchase.

Figures 4, 5:
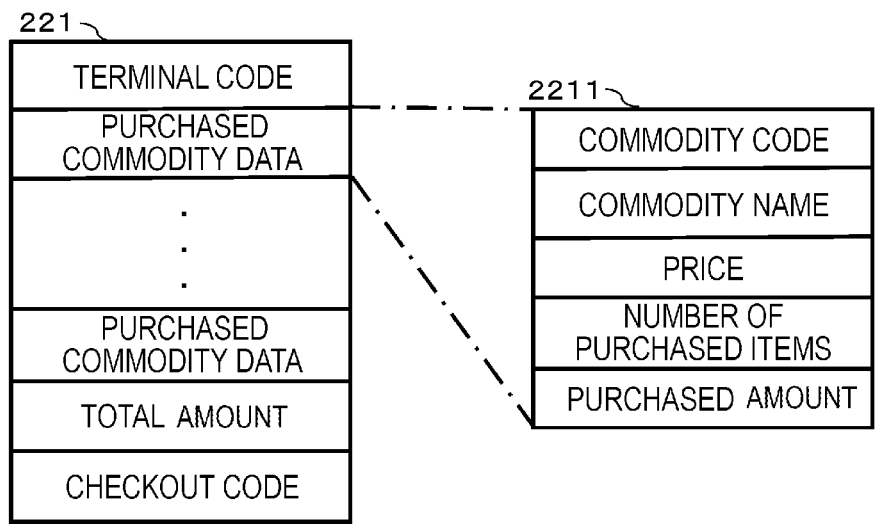
FIG. 4 is a schematic diagram showing an example of a purchase registration list.
FIG. 5 is a schematic diagram showing an example of a time series buffer.

The virtual POS server 20 having such a configuration uses a part of the volatile memory area of the main memory 22 as an area of a purchase registration list 221 (see FIG. 4). The virtual POS server 20 can form a plurality of purchase registration lists 221 in the area. The storage destination of the purchase registration list 221 is not limited to the main memory 22. The purchase registration list 221 may be stored in the auxiliary storage device 23.

FIG. 4 is a schematic diagram showing an example of the purchase registration list 221. As shown in FIG. 4, the purchase registration list 221 has an area for describing the terminal code, the purchased commodity data 2211, the total amount, and the checkout code, respectively. The purchased commodity data 2211 includes a commodity code, a commodity name, price, the number of purchase items, a purchase amount, and the like of the purchase commodity purchased by the user. The number of purchase items is the number of purchases of the commodity identified by the commodity code, and the purchase amount is the total price based on the number of purchase items. The total amount is the total of the purchase amounts included in the purchased commodity data 2211. The checkout code will be described later. The purchase registration list 221 is created in association with the terminal code of the mobile terminal 70.

The virtual POS server 20 uses a part of the storage area of the auxiliary storage device 23 as the area of a time series buffer 231 (see FIG. 5). In the area, time-series buffers 231 having the data structure shown in FIG. 5 are formed as many as the number of mobile terminals 70 that use the sales management system 1 in the store. The storage destination of the time series buffer 231 is not limited to the auxiliary storage device 23. The time series buffer 231 may be stored in a part of the volatile memory area of the main memory 22.

FIG. 5 is a schematic diagram showing an example of the time series buffer 231. As shown in FIG. 5, the time-series buffer 231 has an area for describing the status ST in the order of earliest current date and time DT for each terminal code that identifies the mobile terminal 70. The status ST is information indicating the operating state of the mobile terminal 70. The status ST includes "entering", "registration in progress", "checkout in progress", "checkout completed", and "leaving". "Entering" is, for example, a state in which an entry operation for entering a store was performed. If the user reads the data code for entering the store prepared at the entrance of the store with the camera 75, the status ST is "entering", assuming that the entering operation was performed. The data code for entering the store is a code of setting information peculiar to a store or a business entity that operates the store with a predetermined two-dimensional code system. "Registration in progress" is, for example, a state in which the user themselves is accepting the registration operation of the purchased commodity. If the first purchased commodity is registered, the status ST becomes "registration in progress". After that, the status ST remains "registration in progress" until the transition to checkout is declared. "Checkout in progress" is, for example, the state from the declaration of the transition to checkout to the completion of the checkout process. "Checkout completed" is, for example, a state in which the checkout process of the purchased commodity is completed. "Leaving" is, for example, a state in which a store exit operation for exiting from the store was performed. If the user reads the data code for exiting the store prepared at the exit of the store with the camera 75, the status ST is "leaving", assuming that the store exit operation was performed. The data code for exiting the store is a code of setting information peculiar to a store or the business entity that operates the store with a predetermined two-dimensional code system. Normally, the status ST is described in the time series buffer 231 in the order of "entering", "registration in progress", "checkout in progress", "checkout completed", and "leaving". The operation of setting the status ST to "entering", "registration in progress", "checkout in progress", "checkout completed", or "leaving" is not limited to the above-mentioned operation. The status ST is not limited to "entering", "registration in progress", "checkout in progress", "checkout completed", and "leaving".

Refer back to the description of FIG. 3. The processor 21 has functions as a first acquisition unit 211, a second acquisition unit 212, a third acquisition unit 213, a fourth acquisition unit 214, and an output unit 215. The first acquisition unit 211 is a function of acquiring the terminal identification information, that is, the terminal code, which is set for the mobile terminal 70. The first acquisition unit 211 can be referred to as a first acquisition means.

The second acquisition unit 212 is a function of acquiring status information indicating the operating state of the mobile terminal 70 identified by the terminal code acquired by the first acquisition unit 211. The second acquisition unit 212 can be referred to as a second acquisition means.

The third acquisition unit 213 is a function of acquiring the communication connection state of the mobile terminal 70. The third acquisition unit 213 can be referred to as a third acquisition means.

The fourth acquisition unit 214 is a function of acquiring the location information of the mobile terminal 70 whose status information was acquired by the second acquisition unit 212. The fourth acquisition unit 214 can be referred to as a fourth acquisition means.

The output unit 215 is a function of outputting the terminal code acquired by the first acquisition unit 211 to the clerk terminal 50 possessed by the clerk if the communication connection state of the mobile terminal 70 acquired by the third acquisition unit 213 is unconnected and the status information of the mobile terminal 70 acquired by the second acquisition unit 212 indicates non-checkout before the communication connection state of the mobile terminal 70 becomes unconnected. The output unit 215 can be referred to as an output means.

Figures 6, 7:
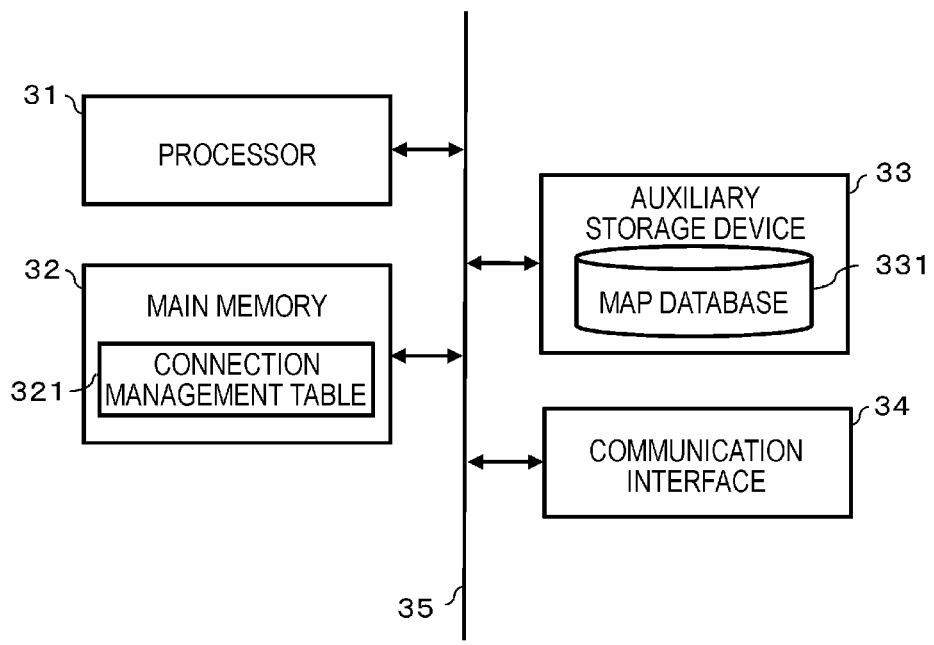
FIG. 6 is a block diagram showing a circuit configuration of a management server.
FIG. 7 is a schematic diagram showing an example of a connection management table.

FIG. 6 is a block diagram showing a circuit configuration of the management server 30. The management server 30 includes a processor 31, a main memory 32, an auxiliary storage device 33, a communication interface 34, and a system transmission line 35. The system transmission line 35 includes an address bus, a data bus, a control signal line, and the like. The management server 30 connects the processor 31, the main memory 32, the auxiliary storage device 33, and the communication interface 34 to the system transmission line 35. In the management server 30, a computer is configured by the processor 31, the main memory 32, the auxiliary storage device 33, and the system transmission line 35 connecting the above.

The processor 31 corresponds to the central portion of the computer. The processor 31 controls each unit in order to implement various functions as the management server 30 according to the operating system or the application program. The processor 31 is, for example, a CPU.

The main memory 32 corresponds to the main memory portion of the computer. The main memory 32 includes a non-volatile memory area and a volatile memory area. The main memory 32 stores an operating system or an application program in a non-volatile memory area. The main memory 32 may store data necessary for the processor 31 to execute a process for controlling each unit in a non-volatile or volatile memory area. The main memory 32 uses a volatile memory area as a work area where data is appropriately rewritten by the processor 31. The non-volatile memory area is, for example, a ROM. The volatile memory area is, for example, a RAM. The main memory 32 functions as a storage unit.

The auxiliary storage device 33 corresponds to the auxiliary storage portion of the computer. For example, an EEPROM, an HDD, an SSD, or the like can be the auxiliary storage device 33. The auxiliary storage device 33 stores data used by the processor 31 to perform various processes, data created by the processes of the processor 31, and the like. The auxiliary storage device 33 may store the above application program.

The communication interface 34 is connected to the network 2. The communication interface 34 performs data communication with another device connected via the network 2 according to a communication protocol.

The management server 30 having such a configuration uses a part of the volatile memory area of the main memory 32 as an area of a connection management table 321 (see FIG. 7). The management server 30 can form the connection management table 321 in the area. The storage destination of the connection management table 321 is not limited to the main memory 32. The connection management table 321 may be stored in the auxiliary storage device 33.

FIG. 7 is a schematic diagram showing an example of the connection management table 321. As shown in FIG. 7, the connection management table 321 describes the terminal code and the communication connection state of the mobile terminal 70 identified by the terminal code. There are "connected" and "not connected" (or unconnected) as the communication connection state. "Connected" is a state in which the mobile terminal 70 is connected to the wireless LAN in the store. Normally, the state will be "connected" while the shopping application is running. "Not connected" is a state in which the mobile terminal 70, which was in a state of being connected to the wireless LAN in the store, is no longer connected to the wireless LAN. The reasons why the mobile terminal 70 is no longer connected to the wireless LAN in the store are, for example, that the battery of the mobile terminal 70 ran out, that some problem occurred in connecting to the wireless LAN, that the user intentionally disconnected from the wireless LAN, and that the user ended the shopping application and left the store. The communication connection state is not limited to "connected" and "not connected".

The management server 30 forms a map database 331 in a part of the storage area of the auxiliary storage device 33. The map database 331 stores a map data record in which map data is described. The map data record includes items such as map data in the store and map data of the area around the store. The storage destination of the map database 331 is not limited to the auxiliary storage device 33. The map database 331 may be stored in a part of the volatile memory area of the main memory 32 or may be stored in a storage device externally attached to the management server 30.

Figure 8:
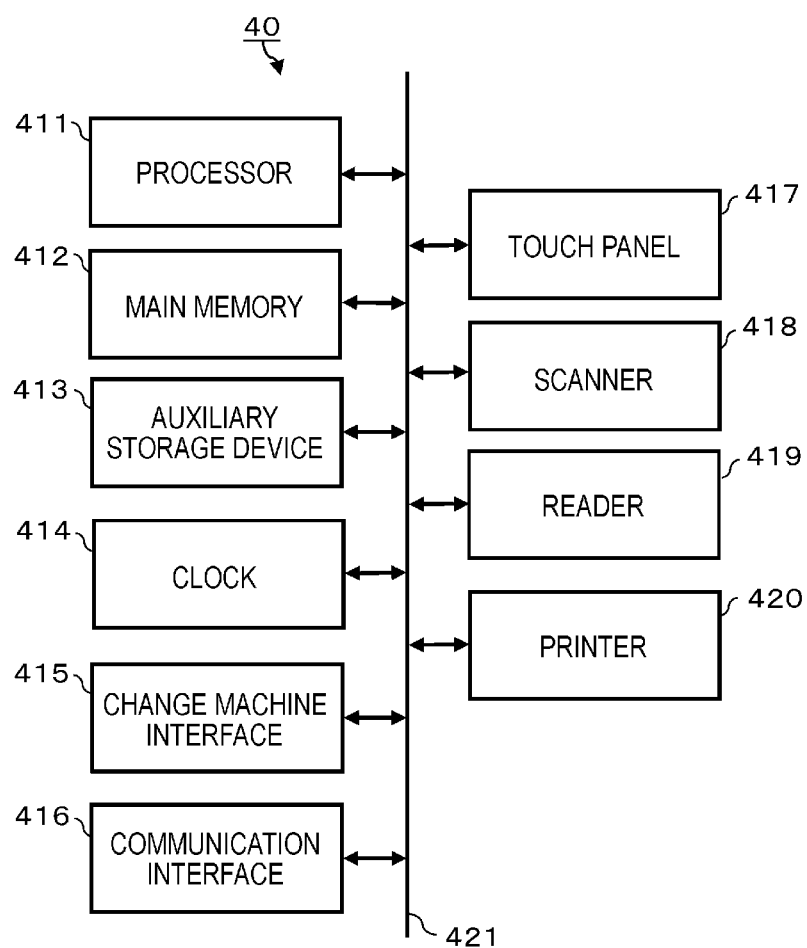
FIG. 8 is a block diagram showing a circuit configuration of a checkout machine.

FIG. 8 is a block diagram showing a circuit configuration of the checkout machine 40. The checkout machine 40 includes a processor 411, a main memory 412, an auxiliary storage device 413, a clock 414, a change machine interface 415, a communication interface 416, a touch panel 417, a scanner 418, a reader 419, a printer 420, and a system transmission line 421. The system transmission line 421 includes an address bus, a data bus, a control signal line, and the like. The system transmission line 421 connects the processor 411, the main memory 412, the auxiliary storage device 413, the clock 414, the change machine interface 415, the communication interface 416, the touch panel 417, the scanner 418, the reader 419, and the printer 420 to each other. The computer of the checkout machine 40 is configured by connecting the processor 411, the main memory 412, and the auxiliary storage device 413 by the system transmission line 421.

The processor 411 corresponds to the central portion of the computer. The processor 411 controls each unit in order to implement various functions as the checkout machine 40 according to the operating system or the application program. The processor 411 is, for example, a CPU.

The main memory 412 corresponds to the main memory portion of the computer. The main memory 412 includes a non-volatile memory area and a volatile memory area. The main memory 412 stores an operating system or application program in a non-volatile memory area. The main memory 412 may store data necessary for the processor 411 to execute a process for controlling each unit in a non-volatile or volatile memory area. The main memory 412 uses a volatile memory area as a work area where data is appropriately rewritten by the processor 411. The non-volatile memory area is, for example, a ROM. The volatile memory area is, for example, a RAM.

The auxiliary storage device 413 corresponds to the auxiliary storage portion of the computer. For example, an EEPROM, an HDD, an SSD, or the like can be the auxiliary storage device 413. The auxiliary storage device 413 stores data used by the processor 411 to perform various processes, data created by the processes of the processor 411, and the like. The auxiliary storage device 413 may store the above application program.

The application program stored in the main memory 412 or the auxiliary storage device 413 includes a control program described for information processing executed by the checkout machine 40. The method of installing the control program in the main memory 412 or the auxiliary storage device 413 is not particularly limited. The control program can be recorded on a removable recording medium, or the control program can be distributed by communication via a network and installed in the main memory 412 or the auxiliary storage device 413. The recording medium may be in any form as long as the medium can store a program and can be read by the device, such as a CD-ROM or a memory card.

The clock 414 functions as a time information source for the checkout machine 40. The processor 411 tracks the current date and time based on the time information measured by the clock 414.

The change machine interface 415 performs data communication with an automatic change machine. The change machine interface 415 receives data on the amount of money inserted, data on the number of coins and bills stored, and the like from the automatic change machine. The change machine interface 415 transmits change data to the automatic change machine.

The communication interface 416 is connected to the network 2. The communication interface 416 performs data communication with another device connected via the network 2 according to a communication protocol.

The touch panel 417 is a device equipped with both an input device and a display device of the checkout machine 40. The touch panel 417 detects the touch position with respect to the displayed image and outputs the touch position information to the processor 411.

The scanner 418 is an example of a reading device that reads a code symbol such as a barcode symbol and a QR code (registered trademark) and outputs the read data to the processor 411. The scanner 418 may be a type that reads a code symbol by scanning a laser beam or may be a type that reads a code symbol from an image captured by an imaging device.

The reader 419 reads the data recorded on the recording medium and outputs the read data to the processor 411. The reader 419 is a magnetic card reader if the recording medium is a magnetic card, and is an integrated circuit (IC) card reader if the recording medium is a contact type IC card. In the case of a recording medium using radio frequency identification (RFID) such as a contactless IC card or a smartphone, an RFID reader is used as the reader 419.

The printer 420 dispenses a receipt by printing various character strings or images on the receipt paper. As the printer 420, for example, a thermal printer, a dot impact printer, or the like can be used. The printer 420 functions as a printing device of the checkout machine 40.

Figure 9:
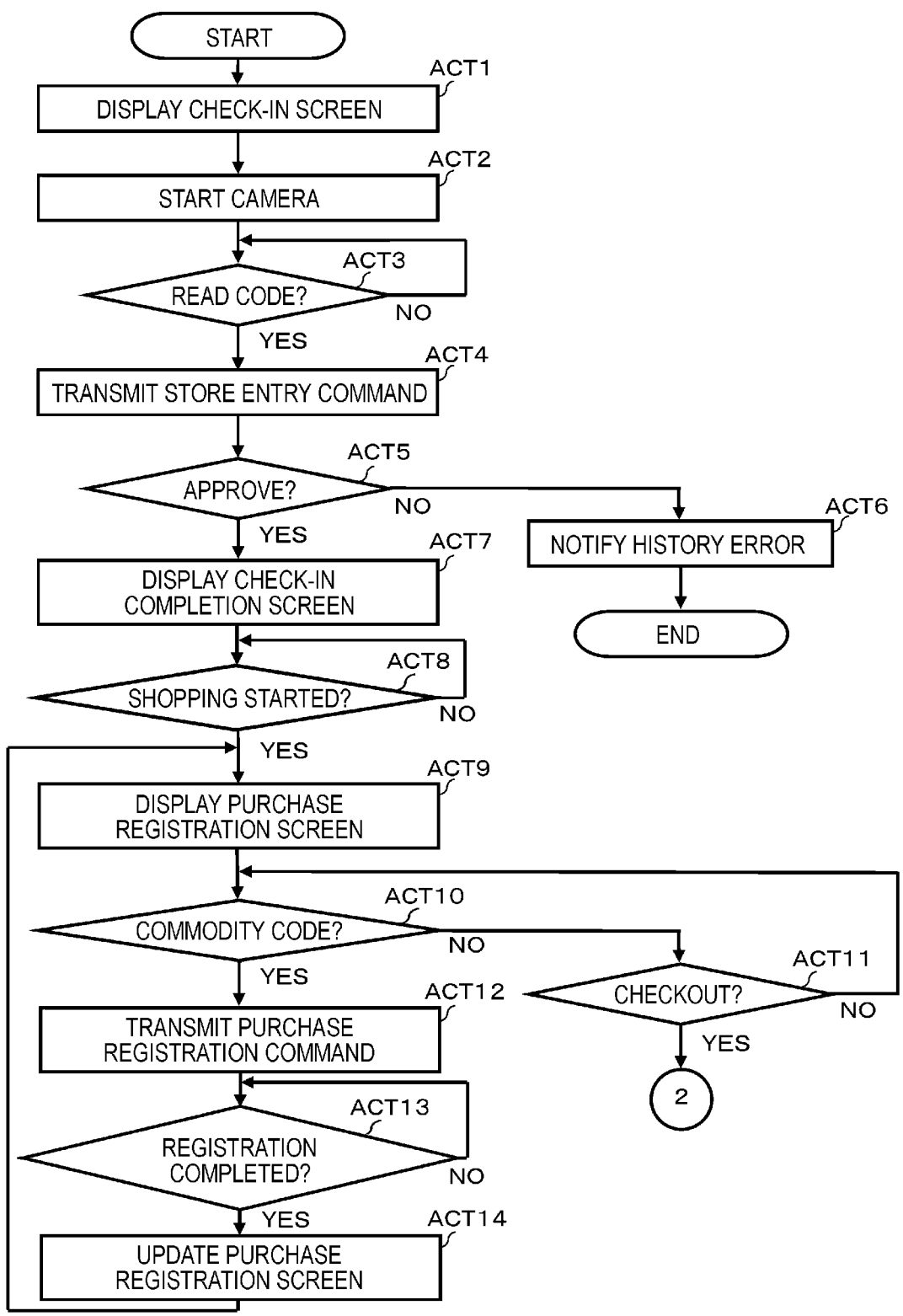
FIG. 9 is a flowchart showing a control procedure of a processor in a mobile terminal.
Figure 10:
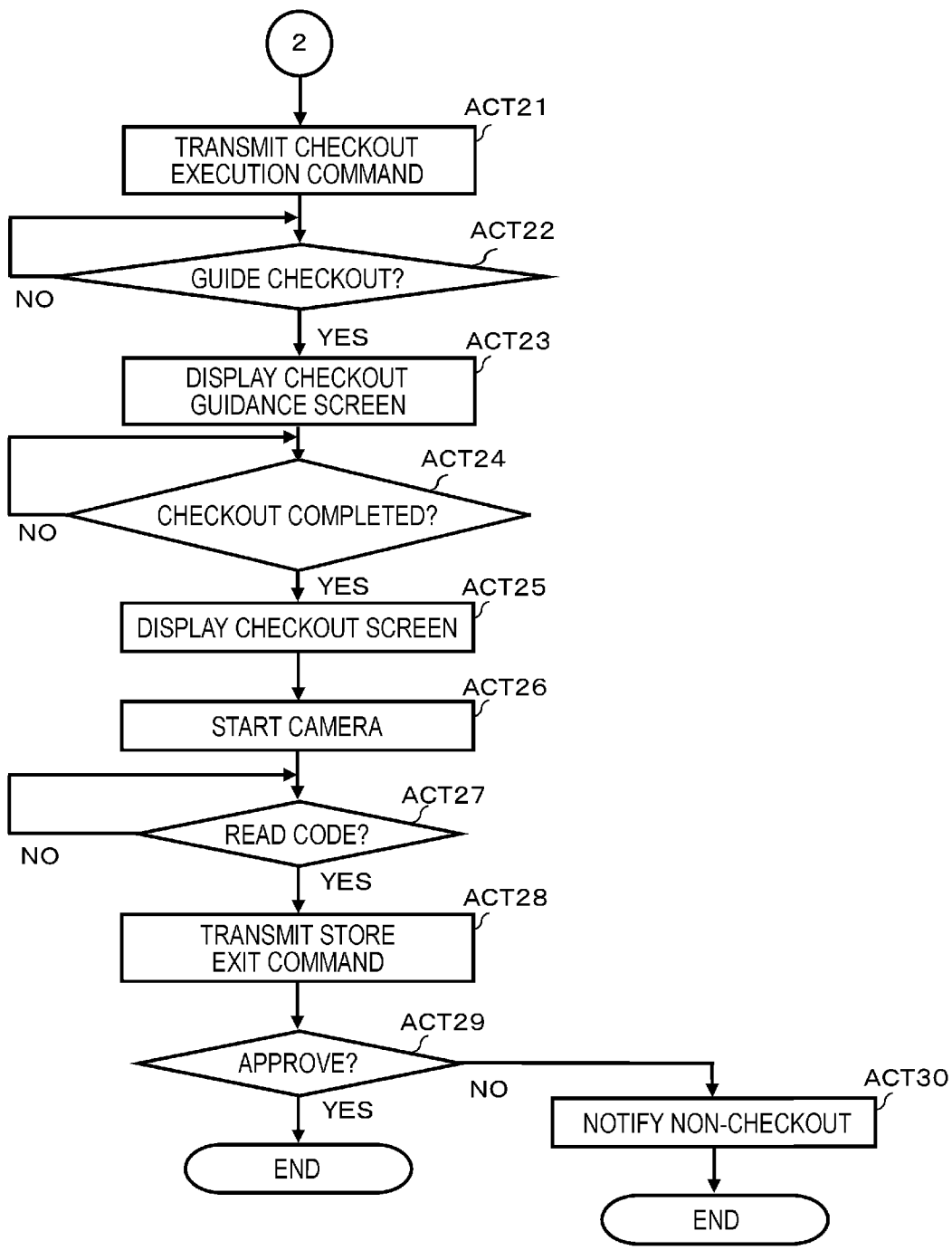
FIG. 10 is another flowchart showing the control procedure of the processor in the mobile terminal.

FIGS. 9 and 10 are flowcharts showing a control procedure executed by the processor 71 of the mobile terminal 70 according to a control program of the sales management system 1. FIGS. 11 to 13, 15, 16, and 18 are flowcharts showing a control procedure executed by the processor 21 of the virtual POS server 20 according to the control program. FIG. 14 is a flowchart showing a control procedure executed by the processor 411 of the checkout machine 40 according to the control program. FIG. 17 is a flowchart showing a control procedure executed by the processor 31 of the management server 30 according to the control program. Hereinafter, using the drawings, the main operations of the sales management system 1 if the user performs the processes from registration to checkout of purchased commodities by himself or herself by using the mobile terminal 70, will be described. The contents of the operation described below are examples. As long as similar results can be obtained, the operation procedure and contents are not particularly limited.

First, if the user goes to the store where the sales management system 1 is introduced, the user starts the shopping application installed on the mobile terminal 70 owned by the user before starting shopping. Then, the processor 71 starts information processing of the procedure shown in the flowchart of FIG. 9. In the present embodiment, the management server 30 acquires the terminal code from the mobile terminal 70 that started the shopping application. Then, the management server 30 describes the terminal code of the mobile terminal 70 and "connected" as the communication connection state in the connection management table 321.

First, the processor 71 controls the touch panel 74 so that the check-in screen is displayed, as ACT 1. On the check-in screen, for example, a message instructing to read the data code for entering the store and an image of a "Yes" button for indicating that the user checked the message are displayed. The user who checked the check-in screen touches the "Yes" button.

If the "Yes" button on the check-in screen is touched, the processor 71 starts the camera 75, as ACT 2. Then, the processor 71 controls the touch panel 74 so that the camera screen is displayed. On the camera screen, for example, an image showing a reading area of a two-dimensional code is displayed. The user who checks the camera screen holds the lens of the camera 75 over the data code for entering the store so that the data code for entering the store prepared at the entrance of the store fits in the image indicating the reading area.

The processor 71 waits for the camera 75 to read the data code for entering the store, as ACT 3. If the data code for entering the store fits within the image showing the reading area, the processor 71 determines that the data code for entering the store was read. The processor 71 determines YES in ACT 3 and proceeds to ACT 4.

The processor 71 controls the wireless unit 76 to transmit a store entry command to the virtual POS server 20, as ACT 4. Therefore, the wireless unit 76 wirelessly transmits the store entry command. The store entry command is received by the access point 60 and sent to the virtual POS server 20 via the network 2. The store entry command includes the terminal code.

If the processor 21 of the virtual POS server 20 receives a command from the mobile terminal 70 via the communication interface 25, the processor 21 checks the type of the command. Then, if the received command is a store entry command, the processor 21 starts the command reception process of the procedure shown in the flowchart of FIG. 11.

The processor 21 acquires the terminal code from the store entry command by the function of the first acquisition unit 211, as ACT 31. Then, the processor 21 extracts the time series buffer 231 identified by the terminal code, as ACT 32.

The processor 21 sets the status ST to "entering" by the function of the second acquisition unit 212, as ACT 33. The processor 21 acquires the current date and time DT tracked by the clock 24, as ACT 34. Then, the processor 21 describes the current date and time DT and the status ST in association with each other in the time series buffer 231 extracted by the process of ACT 32, as ACT 35.

The processor 21 checks whether data indicating a past history error is described in the time series buffer 231, as ACT 36. Specifically, the processor 21 searches for a date and time before the current date and time DT if "entering" was described as the status ST in the process of ACT 35. In the processor 21, if "entering", "registration in progress", and "checkout in progress" are described but "checkout completed" and "leaving" are not described as statuses ST at the date and time before that, it is determined that data indicating a past history error is described. Here, past history error means that there is a history in the time series buffer 231 that the user left the store without completing the checkout at the store or without performing the store exit operation in the past. In the processor 21, for example, if "entering", "registration in progress", "checkout in progress", and "checkout completed" are described as statuses ST in the time series buffer 231 but "leaving" is not described, it is determined that the data indicating a past history error is described. Here, past history error means that there is a history in the time series buffer 231 that the user completed the checkout at the store in the past but left the store without performing the store exit operation.

If data indicating a past history error is described, the processor 21 determines YES in ACT 36 and proceeds to ACT 37. The processor 21 controls the communication interface 25 to transmit a denial response command to the mobile terminal 70, as ACT 37. Therefore, the denial response command is transmitted via the communication interface 25. The denial response command is wirelessly transmitted from the access point 60 via the network 2 and received by the mobile terminal 70 from which the store entry command was transmitted.

The processor 21 controls the communication interface 25 to transmit a first notification command to the clerk terminal 50, as ACT 38. Therefore, the first notification command is transmitted via the communication interface 25. The first notification command is received by the clerk terminal 50 via the network 2. The first notification command includes the terminal code acquired in the process of ACT 31. With the above, the processor 21 ends the process of receiving the store entry command.

The clerk terminal 50 that received the first notification command displays a first warning screen 100 (see FIG. 19) on the touch panel.

Figure 19:
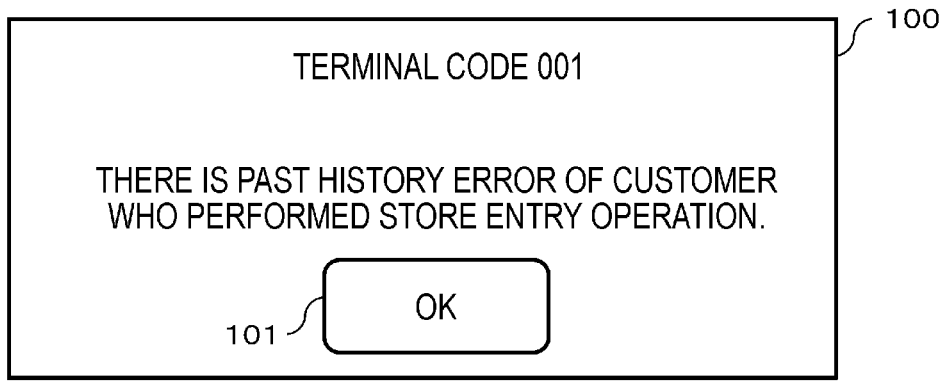
FIG. 19 is a diagram showing an example of a first warning screen.

FIG. 19 is a schematic diagram showing an example of the first warning screen 100. The first warning screen 100 is a screen for notifying the clerk that there is an error in the past history of the user who performed the store entry operation. As shown in FIG. 19, on the first warning screen 100, the terminal code of the mobile terminal 70 and the text data notifying that there is an error in the past history of the user who owns the mobile terminal 70 are displayed. An image of the "OK" button 101 for instructing that the clerk confirmed the first warning screen 100 is displayed. The text data and the contents of the image displayed in FIG. 19 are examples.

The clerk who checked the first warning screen 100 touches the "OK" button 101. Then, the clerk searches for the user in the store. For example, if the user left the store without completing the checkout at the store nor performing the store exit operation in the past, the clerk takes measures such as checking the past fraudulent acts from the user. For example, if the user completed the checkout at the store but left the store without performing the store exit operation in the past, the clerk initializes the time series buffer 231. Thus, the user can shop using the mobile terminal 70.

Figure 11:
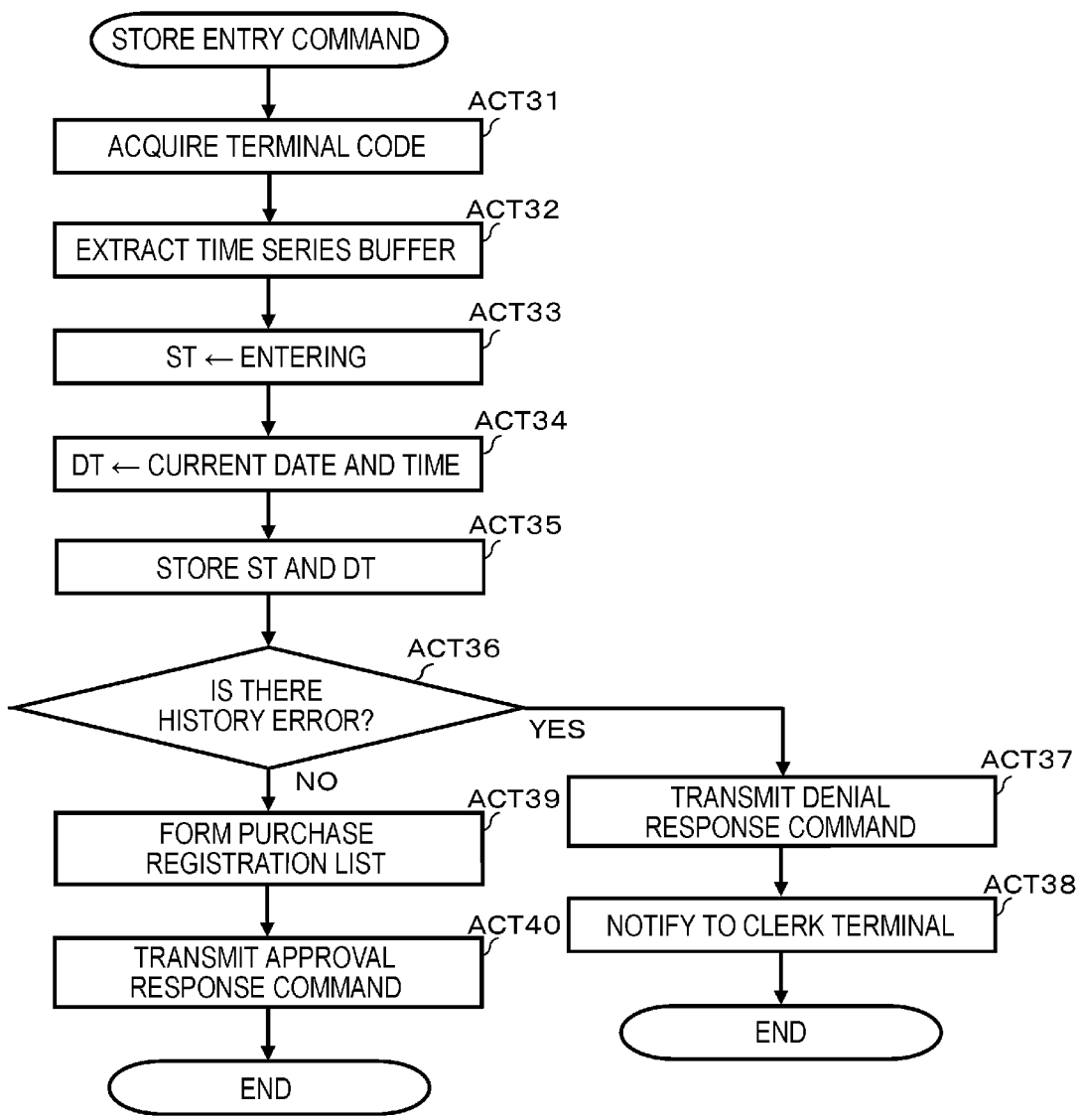
FIG. 11 is a flowchart showing a control procedure of a processor in a virtual POS server.

Refer back to the description of FIG. 11. If the data indicating the past history error is not described, the processor 21 determines NO in ACT 36 and proceeds to ACT 39. The processor 21 forms a purchase registration list 221 in the main memory 22, as ACT 39. Then, the processor 21 stores the terminal code in the purchase registration list 221.

The processor 21 controls the communication interface 25 to transmit an approval response command to the mobile terminal 70, as ACT 40. Therefore, the approval response command is transmitted via the communication interface 25. The approval response command is wirelessly transmitted from the access point 60 via the network 2 and received by the mobile terminal 70 from which the store entry command was transmitted. With the above, the processor 21 ends the process of receiving the store entry command.

Refer back to the description of FIG. 9. The processor 71 of the mobile terminal 70, which controls the transmission of the store entry command in ACT 4, waits for a response command from the virtual POS server 20, as ACT 5. If the denial response command is received from the virtual POS server 20, the processor 71 determines NO in ACT 5 and proceeds to ACT 6.

The processor 71 notifies the history error, as ACT 6. For example, the processor 71 displays a history error screen on the touch panel 74 to notify that there is an error in the past history. On the history error screen, for example, a message for notifying that there is an error in the past history and an image of a "Yes" button for indicating that the user checked the message are displayed. The user who checked the history error screen touches the "Yes" button. Then, the user discusses with the clerk, for example, and the clerk checks the situation and takes measures.

If an approval response command was received from the virtual POS server 20, the processor 71 determines YES in ACT 5 and proceeds to ACT 7.

The processor 71 controls the touch panel 74 so that the check-in completion screen is displayed, as ACT 7. On the check-in completion screen, for example, an image of a "Yes" button is displayed along with a message indicating that shopping is ready. The user who checked the check-in completion screen touches the "Yes" button.

The processor 71, which controlled the display of the check-in completion screen, waits for the instruction to start shopping, as ACT 8. If the "Yes" button on the check-in completion screen is touched, the processor 71 determines that the shopping start is instructed. The processor 71 determines YES in ACT 8 and proceeds to ACT 9.

The processor 71 controls the touch panel 74 so that the purchase registration screen is displayed, as ACT 9. On the purchase registration screen, for example, an area for displaying the commodity names, unit prices, the number of items, the purchase amount, and the total amount of the purchase-registered commodities is formed. An image of the "checkout" button for indicating checkout is displayed.

The user who checked the purchase registration screen goes around the sales floor and contains purchased commodities in a container such as a shopping basket or a shopping cart. For example, the user holds the lens of the camera 75 over the barcode attached to the purchased commodity if the commodity is contained in the container. If the barcode is read by the camera 75, the commodity code represented by the barcode is input to the mobile terminal 70.

The processor 71 checks whether the commodity code was acquired, as ACT 10. If the processor 71 confirms that the commodity code was acquired, the processor 71 determines YES in ACT 10 and proceeds to ACT 12.

The processor 71 controls the wireless unit 76 to transmit a purchase registration command to the virtual POS server 20, as ACT 12. Therefore, the wireless unit 76 wirelessly transmits the purchase registration command. The purchase registration command is received by the access point 60 and sent to the virtual POS server 20 via the network 2. The purchase registration command includes the terminal code and the commodity code of the purchased commodity.

Figure 12:
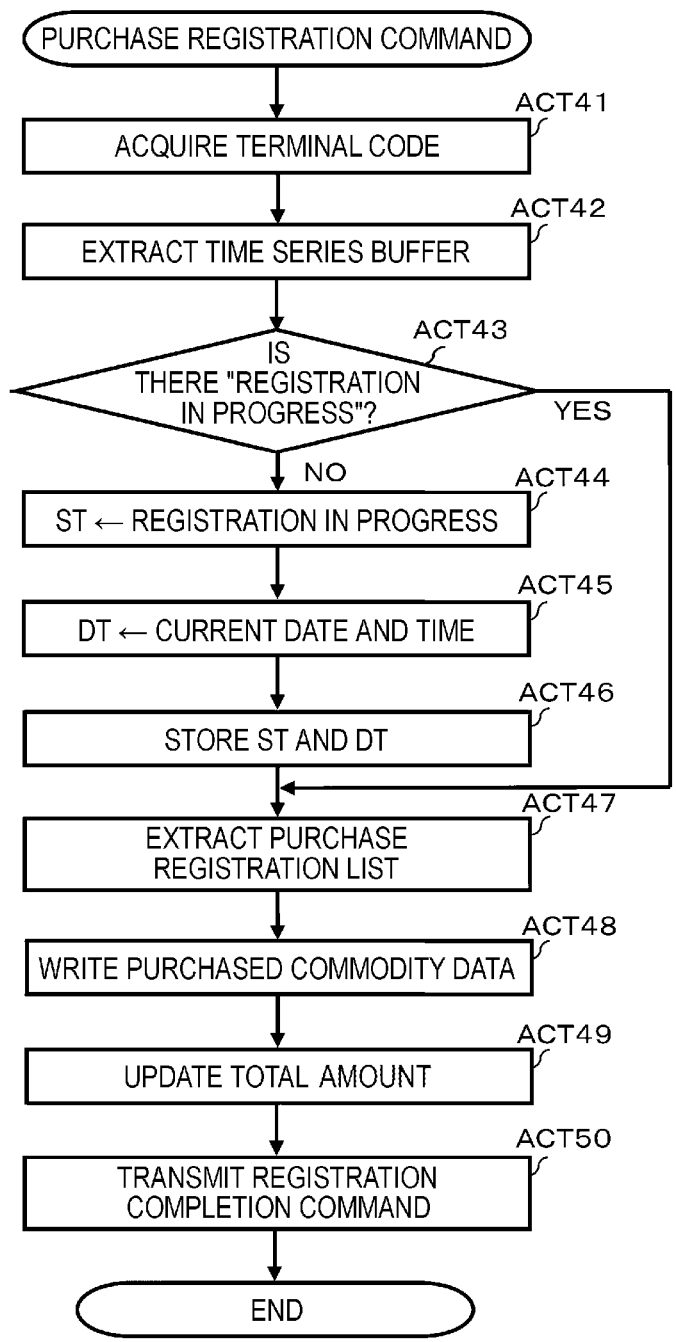
FIG. 12 is another flowchart showing the control procedure of the processor in the virtual POS server.

If the processor 21 of the virtual POS server 20 receives the purchase registration command from the mobile terminal 70 via the communication interface 25, the processor 21 starts the command reception process of the procedure shown in the flowchart of FIG. 12.

The processor 21 acquires the terminal code from the purchase registration command by the function of the first acquisition unit 211, as ACT 41. Then, the processor 21 extracts the time series buffer 231 identified by the terminal code, as ACT 42.

The processor 21 checks whether "registration in progress" as the status ST is described in the last line of the time series buffer 231, as ACT 43. If "registration in progress" as the status ST is described in the last line of the time series buffer 231, it means that the purchased commodity is already registered and the commodity is the second or subsequent purchased commodity. Therefore, if "registration in progress" is described as the status ST, the processor 21 determines YES in ACT 43 and proceeds to ACT 47. The process of ACT 47 will be described later.

If "registration in progress" is not described as the status ST, that is, if the commodity is the first purchased commodity, the processor 21 determines NO in ACT 43 and proceeds to ACT 44. The processor 21 sets the status ST to "registration in progress" by the function of the second acquisition unit 212, as ACT 44.

The processor 21 acquires the current date and time DT tracked by the clock 24, as ACT 45. Then, the processor 21 describes the current date and time DT and the status ST in association with each other in the time series buffer 231 extracted by the process of ACT 42, as ACT 46.

The processor 21 extracts the purchase registration list 221 identified by the terminal code, as ACT 47. The processor 21 creates a purchased commodity data 2211 based on the commodity code included in the purchase registration command and writes purchased commodity data 2211 in the purchase registration list 221, as ACT 48. The processor 21 updates the total amount of the purchase registration list 221 to the amount obtained by adding the purchase amount of the newly written purchased commodity data 2211, as ACT 49.

The processor 21 controls the communication interface 25 to transmit a registration completion command to the mobile terminal 70, as ACT 50. Therefore, the registration completion command is transmitted via the communication interface 25. The registration completion command is wirelessly transmitted from the access point 60 via the network 2 and received by the mobile terminal 70 from which the purchase registration command was transmitted. The registration completion command includes the purchase registration list 221. With the above, the processor 21 ends the process of receiving the purchase registration command.

Refer back to the description of FIG. 9. The processor 71 of the mobile terminal 70, which controlled the transmission of the purchase registration command in ACT 12, waits for a registration completion command from the virtual POS server 20, as ACT 13. If a registration completion command is received from the virtual POS server 20, the processor 71 determines YES in ACT 13 and proceeds to ACT 14.

The processor 71 updates the purchase registration screen, as ACT 14. That is, the processor 71 updates the purchase registration screen so that the commodity names, unit prices, number of items, and purchase amount of the purchase-registered commodities are added and the purchase amount is added to the total amount. Then, the processor 71 returns to ACT 9.

If the commodity code is not acquired, the processor 71 determines NO in ACT 10 and proceeds to ACT 11. The processor 71 checks whether the "checkout" button is touched, as ACT 11. As described above, an image of the "checkout" button is displayed on a part of the purchase registration screen. The user who completed the purchase touches the "checkout" button. If the "checkout" button is touched, the processor 71 determines that checkout is instructed. If the "checkout" button is not touched, the processor 71 determines NO in ACT 11 and returns to ACT 10. That is, the processor 71 returns to the standby state of ACT 10 to ACT 11.

If the processor 71 confirms that the checkout was instructed, it is determined as YES in ACT 11 and proceeds to ACT 21 in FIG. 10. The processor 71 controls the wireless unit 76 to transmit a checkout execution command to the virtual POS server 20, as ACT 21. Therefore, the wireless unit 76 wirelessly transmits the checkout execution command. The checkout execution command is received by the access point 60 and sent to the virtual POS server 20 via the network 2. The checkout execution command includes the terminal code stored in the built-in memory 72.

Figure 13:
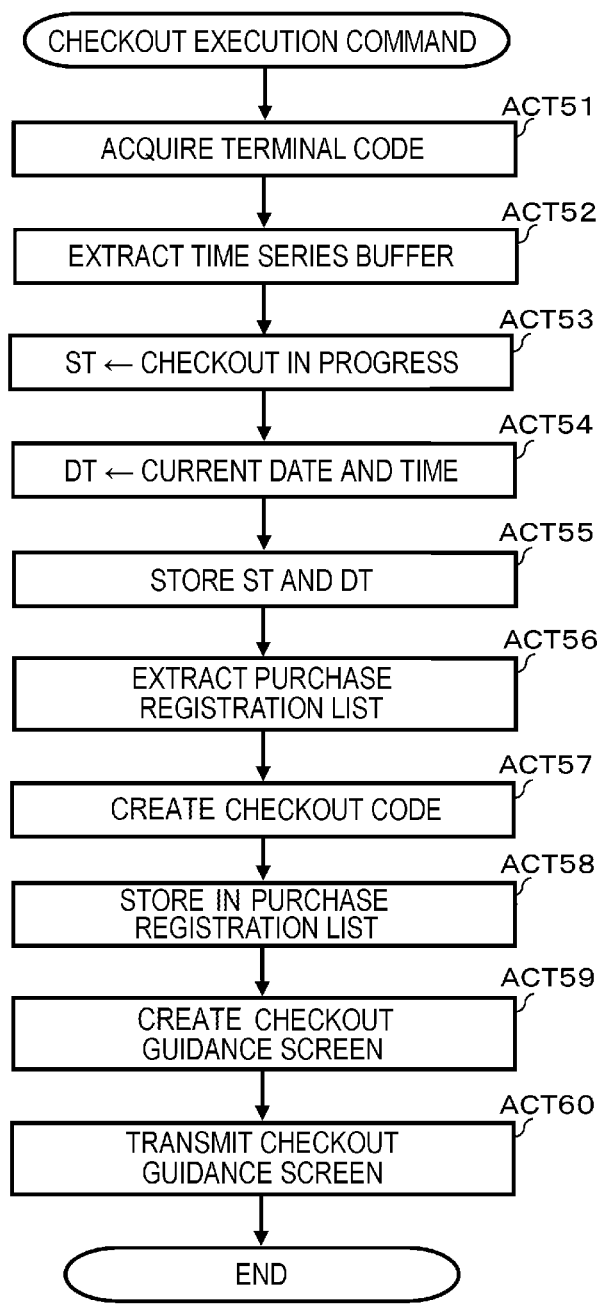
FIG. 13 is a flowchart showing the control procedure of the processor in the virtual POS server.
Figure 14:
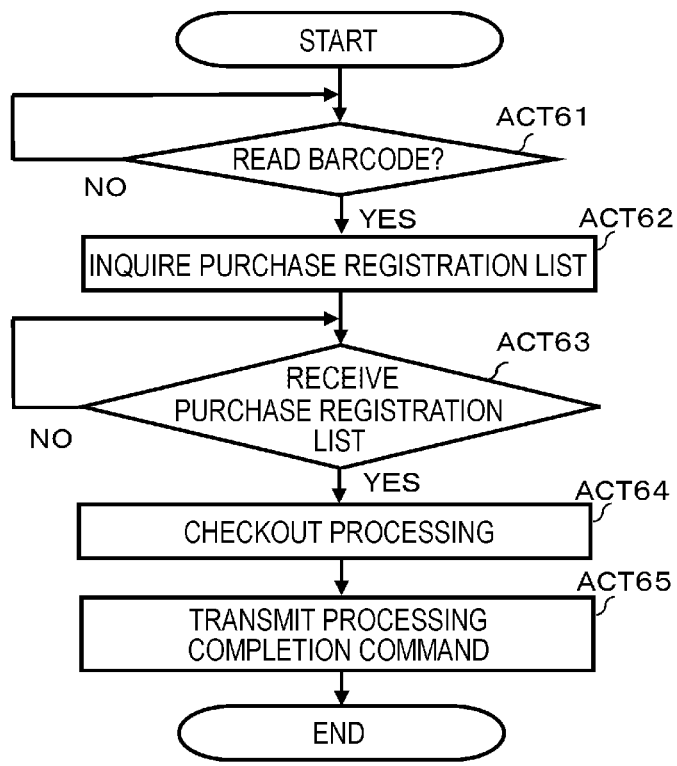
FIG. 14 is a flowchart showing a control procedure of a processor in a checkout machine.

If the processor 21 of the virtual POS server 20 receives the checkout execution command from the mobile terminal 70 via the communication interface 25, the processor 21 starts the command reception process of the procedure shown in the flowchart of FIG. 13.

The processor 21 acquires the terminal code from the checkout execution command by the function of the first acquisition unit 211, as ACT 51. Then, the processor 21 extracts the time series buffer 231 identified by the terminal code, as ACT 52.

The processor 21 sets the status ST to "checkout in progress" by the function of the second acquisition unit 212, as ACT 53. The processor 21 acquires the current date and time DT tracked by the clock 24, as ACT 54. Then, the processor 21 describes the current date and time DT and the status ST in association with each other in the time series buffer 231 extracted by the process of ACT 52, as ACT 55.

The processor 21 extracts the purchase registration list 221 identified by the terminal code, as ACT 56. The processor 21 creates checkout code data, as ACT 57. The checkout code is for identifying a user who performs checkout with the checkout machine 40. The checkout code is created for each user who performs checkout with the checkout machine 40.

The processor 21 stores the checkout code in the purchase registration list 221, as ACT 58. The processor 21 creates a checkout guidance screen, as ACT 59. On the checkout guidance screen, a checkout barcode representing the checkout code created in ACT 57 and a message prompting the scanner 418 provided in the checkout machine 40 to read the checkout barcode are displayed.

The processor 21 controls the communication interface 25 to transmit a checkout guidance command to the mobile terminal 70, as ACT 60. Therefore, the checkout guidance command is transmitted via the communication interface 25. The checkout guidance command is wirelessly transmitted from the access point 60 via the network 2 and received by the mobile terminal 70 from which the checkout execution command was transmitted. The checkout guidance command includes image data of the checkout guidance screen created in ACT 59. With the above, the processor 21 ends the process of receiving the checkout execution command.

Refer back to the description of FIG. 10. The processor 71 of the mobile terminal 70, which controlled the transmission of the checkout execution command in ACT 21, waits for a checkout guidance command from the virtual POS server 20, as ACT 22. If a checkout guidance command is received from the virtual POS server 20, the processor 71 determines YES in ACT 22 and proceeds to ACT 23.

The processor 71 controls the touch panel 74 so that the checkout guidance screen is displayed, as ACT 23. The user who checked the checkout guidance screen goes to the installation location of the available checkout machine 40 and has the scanner 418 provided in the checkout machine 40 read the checkout barcode. Then, the processor 411 of the checkout machine 40 starts information processing of the procedure shown in the flowchart of FIG. 14.

The processor 411 of the checkout machine 40 waits for the checkout barcode to be read, as ACT 61. If the checkout barcode is read, the processor 411 determines YES in ACT 61 and proceeds to ACT 62.

The processor 411 inquires the virtual POS server 20 of the purchase registration list 221 with the checkout barcode read, as ACT 62. In response to the inquiry, the virtual POS server 20 extracts the purchase registration list 221 in which the inquired checkout barcode is stored, and transmits the purchase registration list 221 to the checkout machine 40. Then, the processor 411 waits to receive the purchase registration list 221, as ACT 63. If the purchase registration list 221 is received, the processor 411 determines YES in ACT 63 and proceeds to ACT 64.

The processor 411 executes checkout processing based on the purchased commodity data 2211 in the received purchase registration list 221, as ACT 64. Since the checkout processing is well known existing processing, the specific description thereof will be omitted.

The processor 411 controls the communication interface 416 to transmit the processing completion command to the virtual POS server 20, as ACT 65. Therefore, the processing completion command is transmitted via the communication interface 416. The processing completion command is received by the virtual POS server 20 via the network 2. The processing completion command includes the terminal code stored in the purchase registration list 221. With the above, the processor 411 ends the information processing of the procedure shown in the flowchart of FIG. 14.

Figure 15:
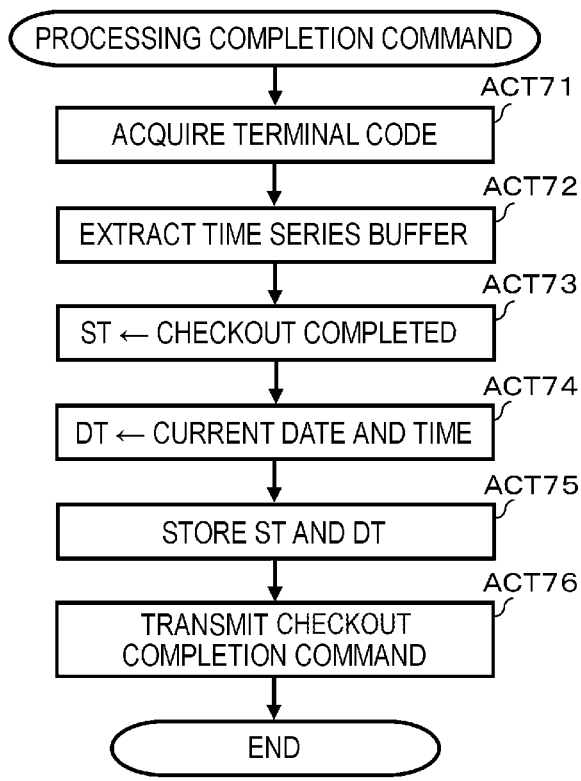
FIG. 15 is a flowchart showing a control procedure of a processor in a virtual POS server.

If the processor 21 of the virtual POS server 20 receives the processing completion command from the mobile terminal 70 via the communication interface 25, the processor 21 starts the command reception process of the procedure shown in the flowchart of FIG. 15.

The processor 21 acquires the terminal code from the processing completion command by the function of the first acquisition unit 211, as ACT 71. The processor 21 extracts the time series buffer 231 identified by the terminal code, as ACT 72.

The processor 21 sets the status ST to "checkout completed" by the function of the second acquisition unit 212, as ACT 73. The processor 21 acquires the current date and time DT tracked by the clock 24, as ACT 74. Then, the processor 21 describes the current date and time DT and the status ST in association with each other in the time series buffer 231 extracted by the process of ACT 72, as ACT 75.

The processor 21 controls the communication interface 25 to transmit the checkout completion command to the mobile terminal 70, as ACT 76. Therefore, the checkout completion command is transmitted via the communication interface 25. The checkout completion command is wirelessly transmitted from the access point 60 via the network 2 and received by the mobile terminal 70. The checkout completion command includes the terminal code. With the above, the processor 21 ends the process of receiving the processing completion command.

Refer back to the description of FIG. 10. The processor 71 that displays the checkout guidance screen waits for a checkout completion command from the virtual POS server 20, as ACT 24. If a checkout completion command is received from the virtual POS server 20, the processor 71 determines YES in ACT 24 and proceeds to ACT 25.

The processor 71 controls the touch panel 74 so that the checkout screen is displayed, as ACT 25. On the checkout screen, for example, a message instructing to read the data code for exiting the store and an image of a "Yes" button for indicating that the user checked the message are displayed. The user who checked the checkout screen touches the "Yes" button.

If the "Yes" button on the checkout screen is touched, the processor 71 starts the camera 75, as ACT 26. Then, the processor 71 controls the touch panel 74 so that the camera screen is displayed. The user who checked the camera screen holds the lens of the camera 75 over the data code for exiting the store so that the data code for exiting the store prepared at the exit of the store fits in the image indicating the reading area.

The processor 71 displaying the camera screen waits for the camera 75 to read the data code for exiting the store, as ACT 27. If the data code for exiting the store fits within the image indicating the reading area, the processor 71 determines that the data code for exiting the store was read. The processor 71 determines YES in ACT 27 and proceeds to ACT 28.

The processor 71 controls the wireless unit 76 to transmit the store exit command to the virtual POS server 20, as ACT 28. Therefore, the wireless unit 76 wirelessly transmits the store exit command. The store exit command is received by the access point 60 and sent to the virtual POS server 20 via the network 2. The store exit command includes the terminal code.

Figure 16:
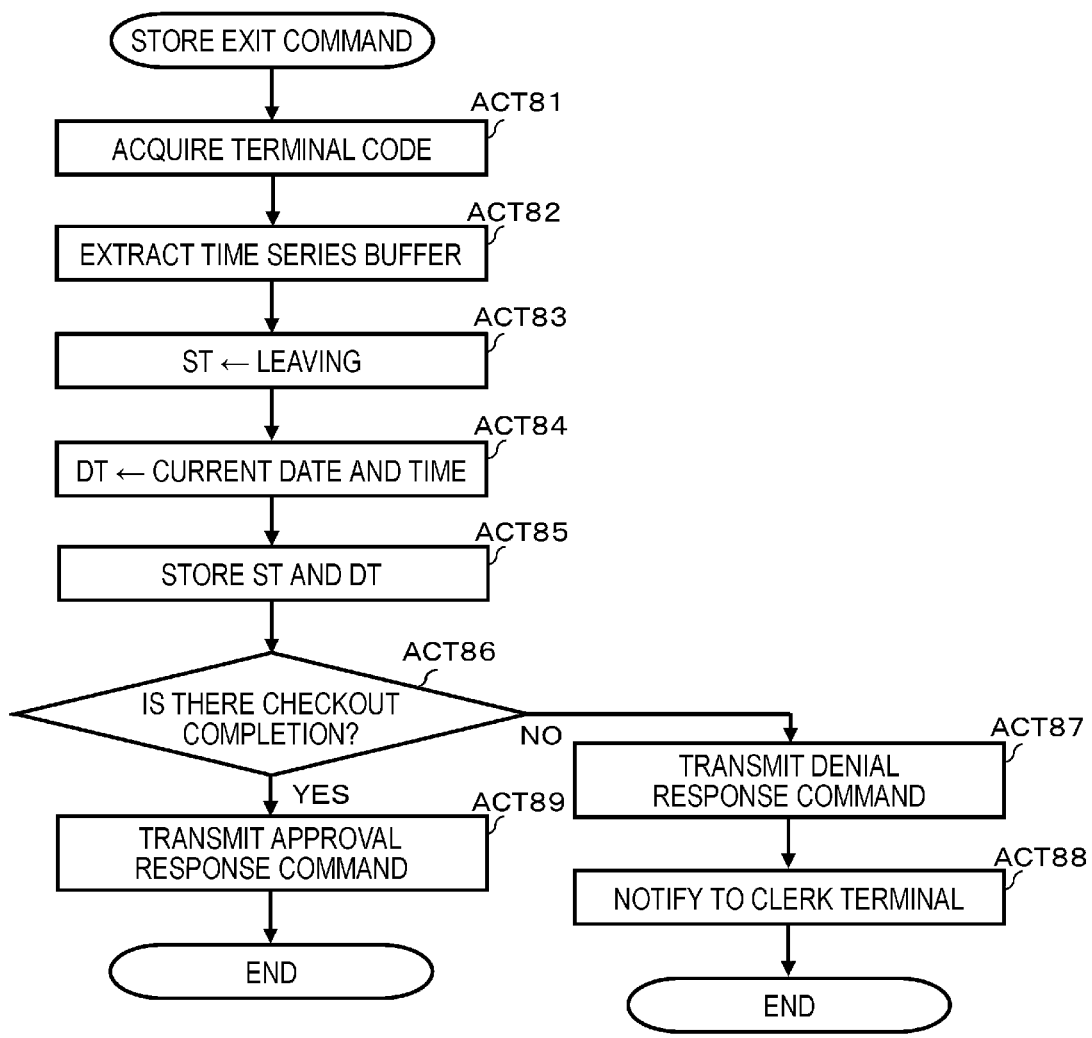
FIG. 16 is another flowchart showing the control procedure of the processor in the virtual POS server.
Figure 17:
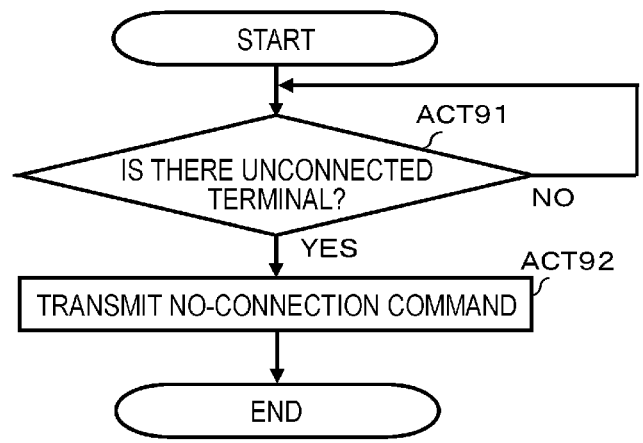
FIG. 17 is a flowchart showing a control procedure of a processor in a management server.

If the processor 21 of the virtual POS server 20 receives the store exit command from the mobile terminal 70 via the communication interface 25, the processor 21 starts the command reception process of the procedure shown in the flowchart of FIG. 16.

The processor 21 acquires the terminal code from the store exit command by the function of the first acquisition unit 211, as ACT 81. Then, the processor 21 extracts the time series buffer 231 identified by the terminal code, as ACT 82.

The processor 21 sets the status ST to "leaving" by the function of the second acquisition unit 212, as ACT 83. The processor 21 acquires the current date and time DT tracked by the clock 24, as ACT 84. Then, the processor 21 describes the current date and time DT and the status ST in association with each other in the time series buffer 231 extracted by the process of ACT 82, as ACT 85.

The processor 21 checks whether "checkout completed" is described as the status ST in the time series buffer 231, as ACT 86. Specifically, the processor 21 checks whether "checkout completed" as the status ST is described on the same date as the current date and time DT if "checkout completed" was described as the status ST in the process of ACT 85, and at a time before the current date and time DT.

If "checkout completed" is not described as the status ST, that is, "entering", "registration in progress", "checkout in progress", and "leaving" are described as the status ST, but "checkout completed" is not described before "leaving", it means that the user performed the purchase commodity registration operation at the store but performed the store exit operation without completing the checkout. Therefore, if "checkout completed" is not described as the status ST, the processor 21 determines NO in ACT 86 and proceeds to ACT 87. The processor 21 controls the communication interface 25 to transmit a denial response command to the mobile terminal 70, as ACT 87. Therefore, the denial response command is transmitted via the communication interface 25. The denial response command is wirelessly transmitted from the access point 60 via the network 2 and received by the mobile terminal 70 from which the store exit command was transmitted.

The processor 21 controls the communication interface 25 to transmit a second notification command to the clerk terminal 50, as ACT 88. Therefore, the second notification command is transmitted via the communication interface 25. The second notification command is received by the clerk terminal 50 via the network 2. The second notification command includes the terminal code acquired in the process of ACT 81. With the above, the processor 21 ends the process of receiving the store exit command.

The clerk terminal 50 that received the second notification command displays a second warning screen 200 (see FIG. 20) on the touch panel.

Figure 20:
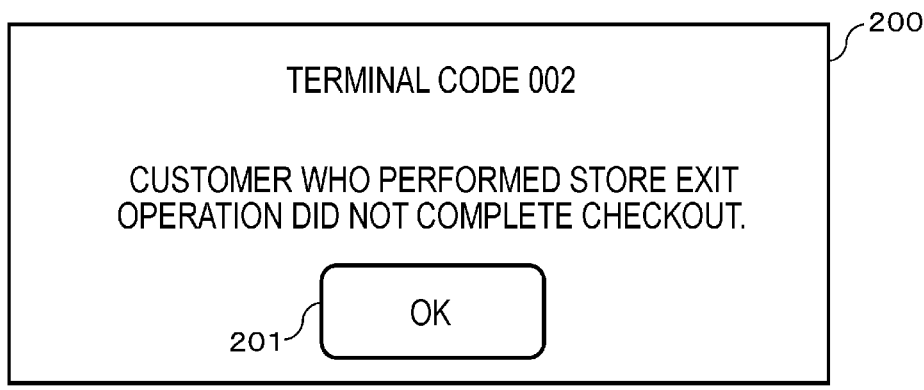
FIG. 20 is a diagram showing an example of a second warning screen.

FIG. 20 is a schematic diagram showing an example of the second warning screen 200. The second warning screen 200 is a screen for notifying the clerk that the user who performed the store exit operation did not complete the checkout. As shown in FIG. 20, the terminal code of the mobile terminal 70 and the text data notifying that the user who owns the mobile terminal 70 did not complete the checkout are displayed on the second warning screen 200. An image of the "OK" button 201 for instructing that the clerk checked the second warning screen 200 is displayed. The text data and the contents of the image displayed in FIG. 20 are examples.

The clerk who checked the second warning screen 200 touches the "OK" button 201. Then, the clerk searches for the user in the store and takes measures such as guiding the user to the installation location of the checkout machine 40.

Refer back to the description of FIG. 16. If "checkout completed" is described as the status ST, the processor 21 determines YES in ACT 86 and proceeds to ACT 89. The processor 21 controls the communication interface 25 to transmit an approval response command to the mobile terminal 70, as ACT 89. Therefore, the approval response command is transmitted via the communication interface 25. The approval response command is wirelessly transmitted from the access point 60 via the network 2 and received by the mobile terminal 70 from which the store exit command was transmitted. With the above, the processor 21 ends the process of receiving the store exit command.

Refer back to the description of FIG. 10. If the processor 71 of the mobile terminal 70 that controlled the transmission of the store exit command in ACT 28 receives the approval response command from the virtual POS server 20 as ACT 29, the processor 71 determines YES in ACT 29 and ends the information processing of the procedures shown in the flowcharts of FIGS. 9 and 10.

If the denial response command is received from the virtual POS server 20, the processor 71 determines NO in ACT 29 and proceeds to ACT 30. The processor 71 notifies the non-checkout, as ACT 30. For example, the processor 71 displays a non-checkout screen on the touch panel 74 to notify that the checkout was not completed. On the non-checkout screen, a message notifying that the checkout was not completed and an image of a "Yes" button indicating that the user checked the message are displayed. The user who checked the non-checkout screen will touch the "Yes" button to return to the purchase registration screen and touch the "checkout" button. This completes the information processing of the procedures shown in the flowcharts of FIGS. 9 and 10.

By the way, in the connection management table 321, the management server 30 manages the mobile terminal 70 that was connected to the wireless LAN in the store but is no longer connected due to reasons, for example, that the battery of the mobile terminal 70 ran out, that some trouble occurred in connecting to the wireless LAN, that the user intentionally disconnected from the wireless LAN, or that the user ended the shopping application and left the store. That is, the processor 31 of the management server 30 waits for the existence of the terminal code in which "not connected" or "unconnected" is described as the communication connection state among the terminal codes described in the connection management table 321, as ACT 91 of FIG. 17. If there is a terminal code in which "not connected" is described as the communication connection state, the processor 31 determines YES in ACT 91 and proceeds to ACT 92.

The processor 31 controls the communication interface 34 to transmit a no-connection command to the virtual POS server 20, as ACT 92. Therefore, the no-connection command is transmitted via the communication interface 34. The no-connection command is received by the virtual POS server 20 via the network 2. The no-connection command includes a terminal code in which "not connected" is described as the communication connection state. With the above, the processor 31 ends the information processing of the procedure shown in the flowchart of FIG. 17.

Figure 18:
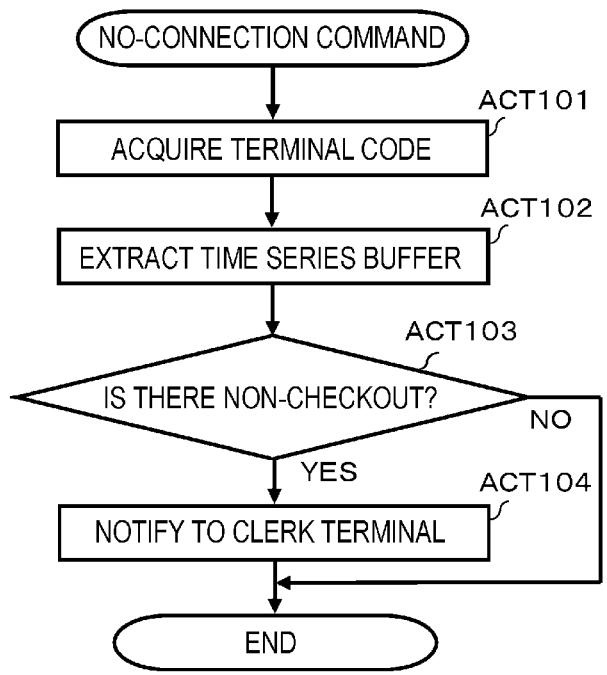
FIG. 18 is a flowchart showing a control procedure of a processor in a virtual POS server.

If the processor 21 of the virtual POS server 20 receives the no-connection command from the management server 30 via the communication interface 25 by the function of the third acquisition unit 213, the processor 21 starts the command reception process of the procedure shown in the flowchart of FIG. 18.

The processor 21 acquires the terminal code from the no-connection command by the function of the first acquisition unit 211, as ACT 101. Then, the processor 21 extracts the time series buffer 231 identified by the terminal code, as ACT 102.

The processor 21 checks whether data indicating the current non-checkout is described in the time series buffer 231, as ACT 103. Specifically, in the processor 21, for example, "entering" and "registration in progress" are described but "checkout completed" is not described as a status ST in the time series buffer 231, it is determined that the data indicating the current non-checkout is described. In the processor 21, for example, if "entering", "registration in progress", and "checkout in progress" are described but "checkout completed" is not described as statuses ST in the time series buffer 231, it is determined that the data indicating the current non-checkout is described. Here, it means that the user performed the purchase commodity registration operation at the store, but did not complete the checkout.

If the data indicating the current non-checkout is not described, that is, if the user completed the checkout at the store, for example, it is considered that the user ended the shopping application and left the store, and the mobile terminal 70 is thus no longer connected to the wireless LAN in the store. Therefore, if the data indicating the current non-checkout is not described, the processor 21 determines NO in ACT 103 and ends the process of receiving the no-connection command.

If the data indicating the current non-checkout is described, the processor 21 determines YES in ACT 103 and proceeds to ACT 104. The processor 21 controls the communication interface 25 to transmit a third notification command to the clerk terminal 50 by the function of the output unit 215, as ACT 104. Therefore, the third notification command is transmitted via the communication interface 25. The third notification command is received by the clerk terminal 50 via the network 2. The third notification command includes the terminal code acquired in the process of ACT 101. With the above, the processor 21 ends the process of receiving the no-connection command.

The clerk terminal 50 that received the third notification command displays a third warning screen 300 (see FIG. 21) on the touch panel.

Figure 21:
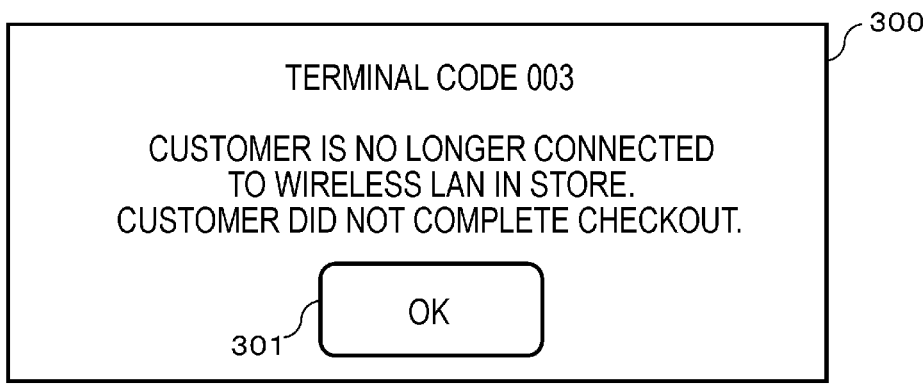
FIG. 21 is a diagram showing an example of a third warning screen.

FIG. 21 is a schematic diagram showing an example of the third warning screen 300. The third warning screen 300 is a screen for notifying the clerk that the user who owns the mobile terminal 70 that is no longer connected to the wireless LAN in the store did not complete the checkout. As shown in FIG. 21, on the third warning screen 300, the terminal code of the mobile terminal 70 and the text data notifying that the mobile terminal 70 are no longer connected to the wireless LAN in the store and the user who owns the mobile terminal 70 did not complete the checkout are displayed. An image of a "OK" button 301 for indicating that the clerk checked the third warning screen 300 is displayed. The text data and the contents of the image displayed in FIG. 21 are examples.

The clerk who checked the third warning screen 300 touches the "OK" button 301. Then, the clerk searches for the user in the store. For example, if the mobile terminal 70 is no longer connected to the wireless LAN in the store due to reasons such as that the battery of the mobile terminal 70 ran out or some trouble occurred in connecting to the wireless LAN, it does not correspond to fraudulent acts. Therefore, the clerk provides the user with guidance on how to deal with such reasons. If the problem is solved, the user can continue shopping by using the mobile terminal 70 again. For example, if the mobile terminal 70 is no longer connected to the wireless LAN in the store due to the reason such as the user intentionally ended the shopping application and left the store, it corresponds to a fraudulent act that the user left the store without completing the checkout. Here, the clerk records the terminal code displayed on the third warning screen 300 in the fraudulent act list or the like. If the user who committed the fraudulent act performs the store re-entry operation, a history error screen is displayed on the touch panel 74 of the mobile terminal 70. The first warning screen 100 is displayed on the touch panel of the clerk terminal 50. Therefore, the clerk can take measures such as checking the past fraudulent acts from the user.

Therefore, in such a sales management system 1, if a store entry command is transmitted from the mobile terminal 70 to the virtual POS server 20, the terminal code of the mobile terminal 70 is acquired. In the time series buffer 231 identified by the terminal code, the current date and time DT and the status ST of "entering" are described in association with each other. If a purchase registration command is transmitted from the mobile terminal 70 to the virtual POS server 20, the terminal code of the mobile terminal 70 is acquired. In the time series buffer 231 identified by the terminal code, the current date and time DT and the status ST of "registration in progress" are described in association with each other. If a checkout execution command is transmitted from the mobile terminal 70 to the virtual POS server 20, the terminal code of the mobile terminal 70 is acquired. In the time series buffer 231 identified by the terminal code, the current date and time DT and the status ST of "checkout in progress" are described in association with each other. If a processing completion command is transmitted from the checkout machine 40 to the virtual POS server 20, the terminal code of the mobile terminal 70 for which the checkout processing was executed by the checkout machine 40 is acquired. In the time series buffer 231 identified by the terminal code, the current date and time DT and the status ST of "checkout completed" are described in association with each other. If a store exit command is transmitted from the mobile terminal 70 to the virtual POS server 20, the terminal code of the mobile terminal 70 is acquired. In the time series buffer 231 identified by the terminal code, the current date and time DT and the status ST of "leaving" are described in association with each other. If the management server 30 confirms that there is a terminal code in which "not connected" is described as the communication connection state of the connection management table 321, that is, a terminal code that was connected to the wireless LAN in the store but is no longer connected, a no-connection command is transmitted to the virtual POS server 20. If the no-connection command is received by the virtual POS server 20, the terminal code of the mobile terminal 70 is acquired. In the time series buffer 231 identified by the terminal code, "entering" and "registration in progress" are described but "checkout completed" is not described as a status ST, or "entering", "registration in progress", and "checkout in progress" are described but "checkout completed" is not described as a status ST, it is assumed that the data indicating the current non-checkout is described and the third notification command including the corresponding terminal code is output to the clerk terminal 50. Then, the third warning screen 300 is displayed on the clerk terminal 50. On the third warning screen 300, the terminal code of the mobile terminal 70 that is no longer connected to the wireless LAN in the store and did not complete the checkout is displayed. Therefore, the clerk can appropriately deal with the act of the user taking out the purchased commodity whose checkout was not completed from the store.

Second Embodiment

Next, the second embodiment will be described with reference to FIGS. 22 to 33.

The second embodiment is different from the first embodiment in that the time series buffer 231 further has an area for describing the location information of the mobile terminal 70. The second embodiment is different from the first embodiment in that an in-store map, an image of a mark indicating the position of the mobile terminal 70, and the text data notifying the time if the mobile terminal 70 was located at the position are further displayed on the first warning screen 100, the second warning screen 200, and the third warning screen 300. In each drawing according to the second embodiment and its description below, the same elements as those in the first embodiment are designated by the same reference numerals. Therefore, the description of the same element may be omitted. Incidentally, FIGS. 1 to 4, 6 to 8, 14, and 17 used in the description of the first embodiment are common to the second embodiment, and thus the description thereof will be omitted here.

FIG. 22 is a schematic diagram showing an example of the time series buffer 231 in the second embodiment. As shown in FIG. 22, the time-series buffer 231 has an area for describing the status ST and location information LO in the order of the earliest of the current date and time DT for each terminal code that identifies the mobile terminal 70. The location information LO is information indicating the current location of the mobile terminal 70.

Figure 23:
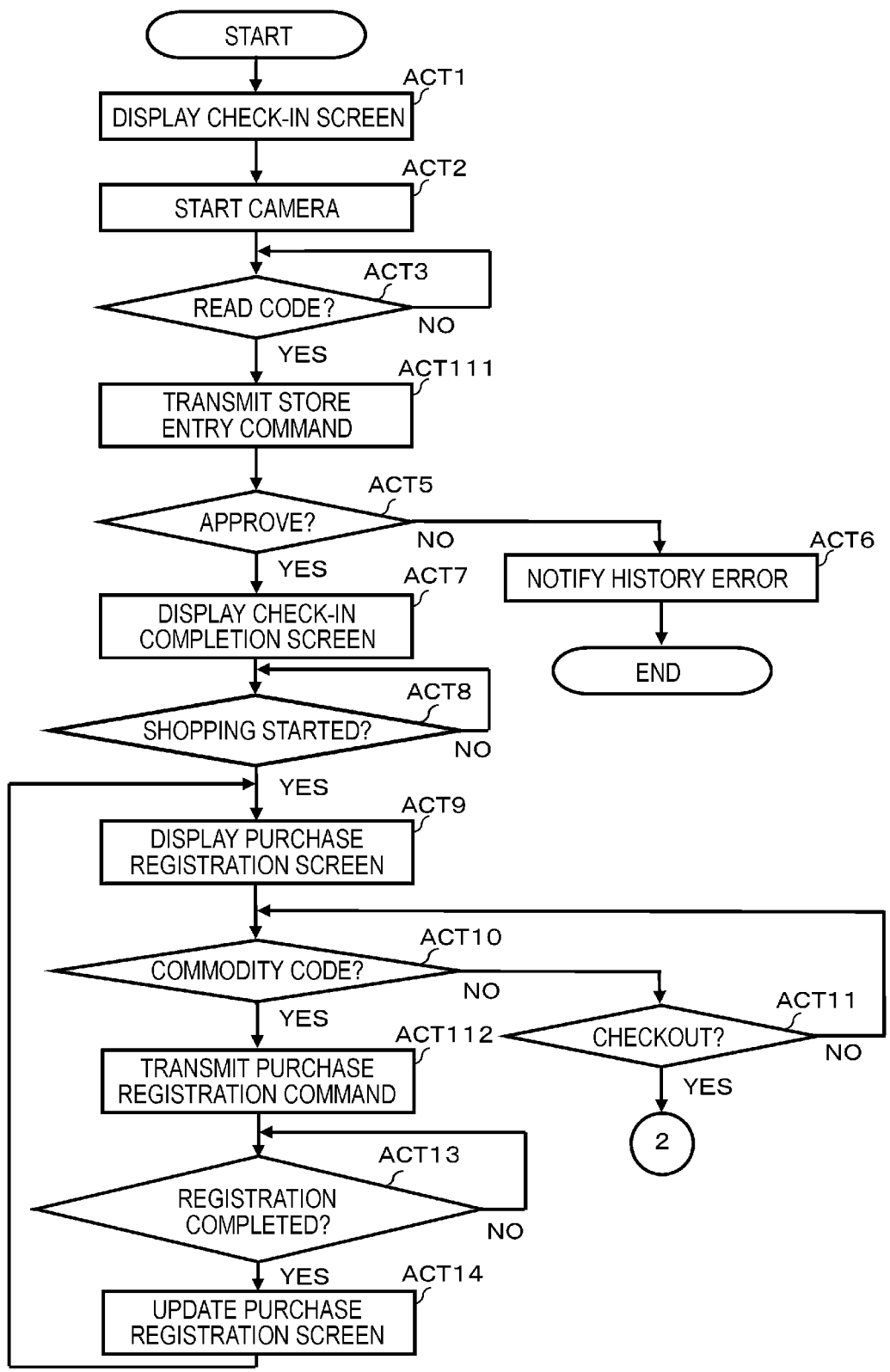
FIG. 23 is a flowchart showing a control procedure of a processor in a mobile terminal.
Figure 24:
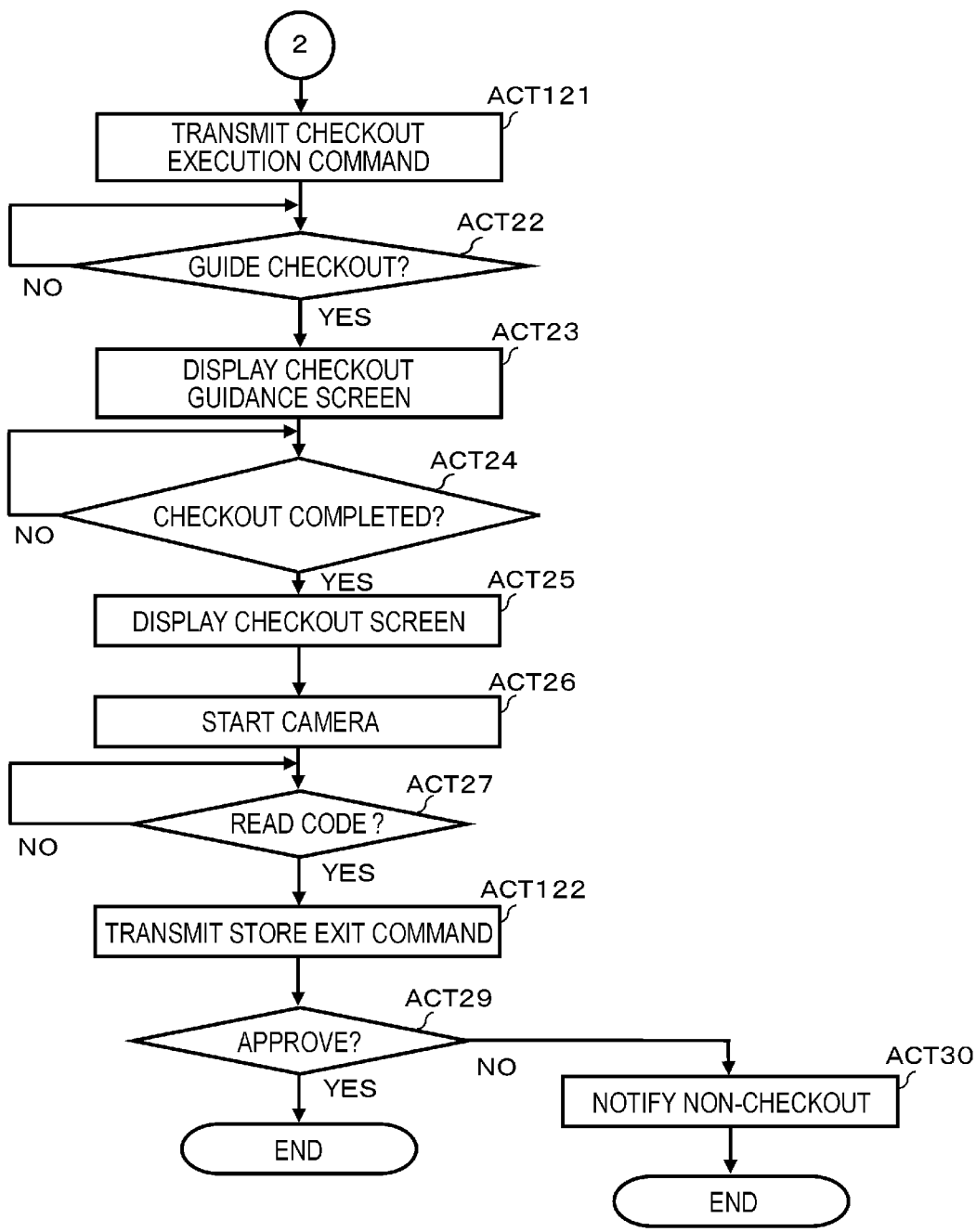
FIG. 24 is a flowchart showing a control procedure of a processor in a mobile terminal.

FIGS. 23 and 24 are flowcharts showing a control procedure executed by the processor 71 of the mobile terminal 70 according to the control program in the second embodiment. FIGS. 25 to 30 are flowcharts showing a control procedure executed by the processor 21 of the virtual POS server 20 according to the control program in the second embodiment. FIGS. 23, 24, 25, 26, 27, 28, 29, and 30 correspond to FIGS. 9, 10, 11, 12, 13, 15, 16, and 18 described in the first embodiment, respectively. Therefore, the same processing steps as those in the first embodiment are designated by the same reference numerals. The contents of the operation described below are examples. As long as similar results can be obtained, the operation procedure and contents are not particularly limited.

As in the first embodiment, in the second embodiment, the management server 30 acquires the terminal code from the mobile terminal 70 that started the shopping application. Then, the management server 30 describes the terminal code of the mobile terminal and "connected" as the communication connection state in the connection management table 321.

In the second embodiment, the processes of ACT 1 to ACT 3 in FIG. 23 are the same as those of the first embodiment. The processor 71 controls the wireless unit 76 to transmit a store entry command to the virtual POS server 20, as ACT 111. Therefore, the wireless unit 76 wirelessly transmits the store entry command. The store entry command is received by the access point 60 and sent to the virtual POS server 20 via the network 2. The store entry command includes the terminal code and location information. The location information is the location of the mobile terminal 70 at the start of transmission of the store entry command, which is positioned by the GPS sensor 77.

Figure 25:
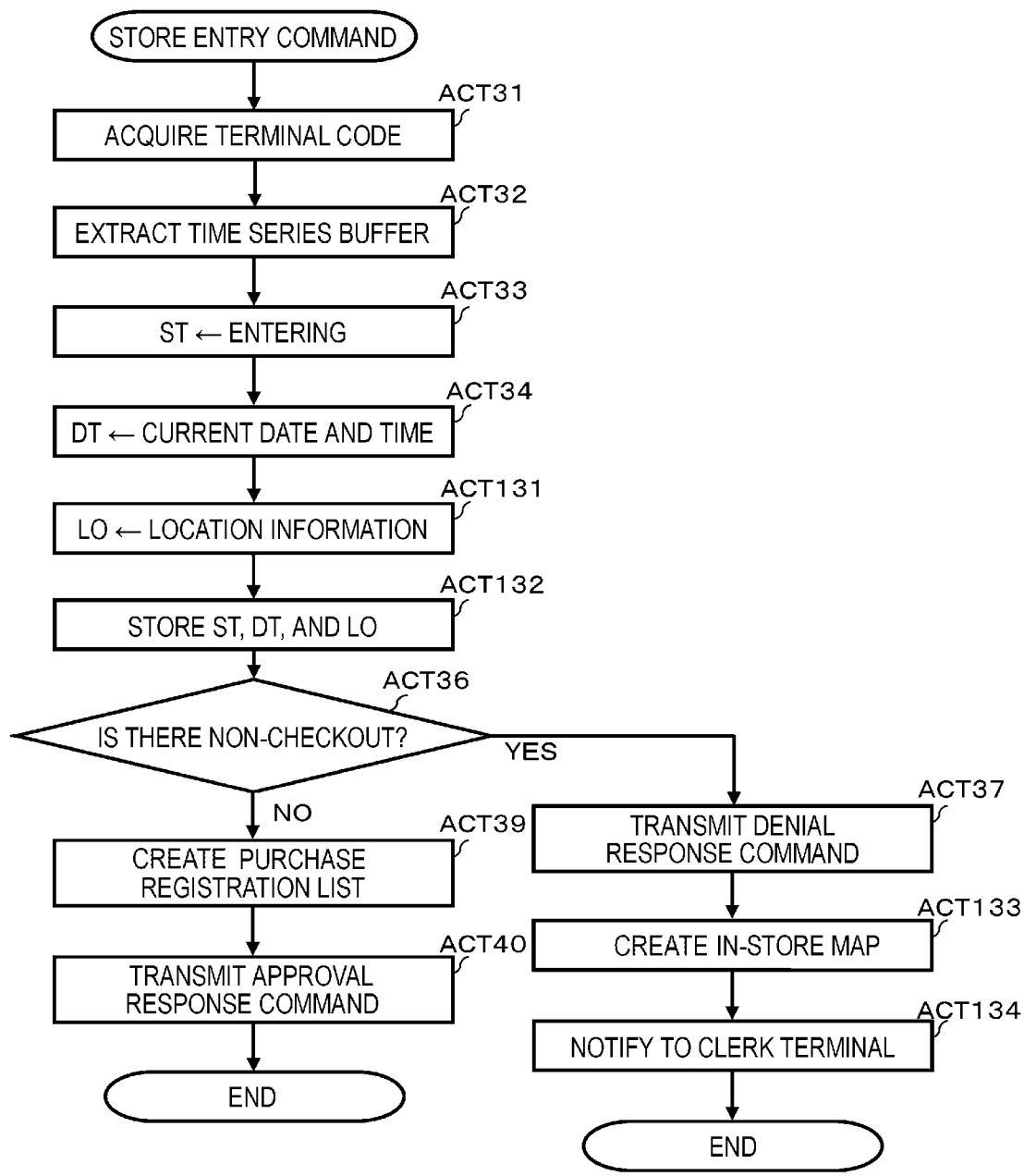
FIG. 25 is a flowchart showing a control procedure of a processor in a virtual POS server.

If the processor 21 of the virtual POS server 20 receives the store entry command from the mobile terminal 70 via the communication interface 25, the processor 21 starts the command reception process of the procedure shown in the flowchart of FIG. 25.

In the second embodiment, the processes of ACT 131 and ACT 132 are performed after the process of ACT 34.

The processor 21 acquires the location information LO from the store entry command by the function of the fourth acquisition unit 214, as ACT 131. Then, the processor 21 describes the current date and time DT, the status ST, and the location information LO in association with each other in the time series buffer 231 extracted by the process of ACT 32, as ACT 132.

In the second embodiment, the processes of ACT 133 and ACT 134 are performed after the process of ACT 37.

The processor 21 creates an in-store map based on the current date and time DT and the location information LO described in the time series buffer 231 in the process of ACT 132, and the map database 331, as ACT 133. The processor 21 creates, for example, an in-store map showing the location of the mobile terminal 70 at the start of transmission of the store entry command.

The processor 21 controls the communication interface 25 to transmit the first notification command to the clerk terminal 50, as ACT 134. Therefore, the first notification command is transmitted via the communication interface 25. The first notification command is received by the clerk terminal 50 via the network 2. The first notification command includes the terminal code acquired by the process of ACT 31 and the image data of the in-store map created by the process of ACT 133.

The clerk terminal 50 that received the first notification command displays the first warning screen 100 (see FIG. 31) with the in-store map on the touch panel.

Figure 31:
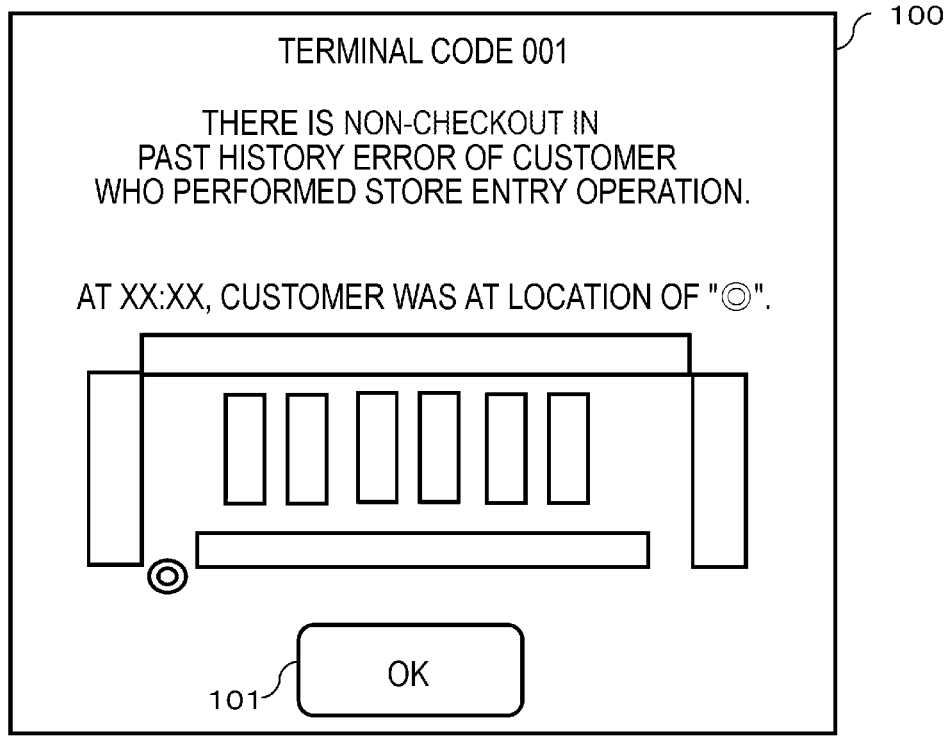
FIG. 31 is a diagram showing an example of a first warning screen with an in-store map.

FIG. 31 is a schematic diagram showing an example of the first warning screen 100 with an in-store map. As can be seen by comparing FIGS. 19 and 31, in the second embodiment, the in-store map, the image of the mark M indicating the location of the mobile terminal 70, and text data notifying the time if the mobile terminal 70 was at the location are further displayed on the first warning screen 100. In the case of FIG. 31, a double circle mark is displayed as a mark M. The mark M is not limited to a figure and may be any one that can identify the location of the mobile terminal 70. The text data and the contents of the image displayed in FIG. 31 are examples.

The clerk who checked the first warning screen 100 with the in-store map touches the "OK" button 101. Then, the clerk searches for the user based on the mark M displayed on the in-store map.

Refer back to the description of FIG. 23. The processes of ACT 5 to ACT 10 are the same as those of the first embodiment. The processor 71 controls the wireless unit 76 to transmit the purchase registration command to the virtual POS server 20, as ACT 112. Therefore, the wireless unit 76 wirelessly transmits the purchase registration command. The purchase registration command is received by the access point 60 and sent to the virtual POS server 20 via the network 2. The purchase registration command includes the terminal code and location information. The location information is the location of the mobile terminal 70 at the start of transmission of the purchase registration command, which is positioned by the GPS sensor 77.

Figure 26:
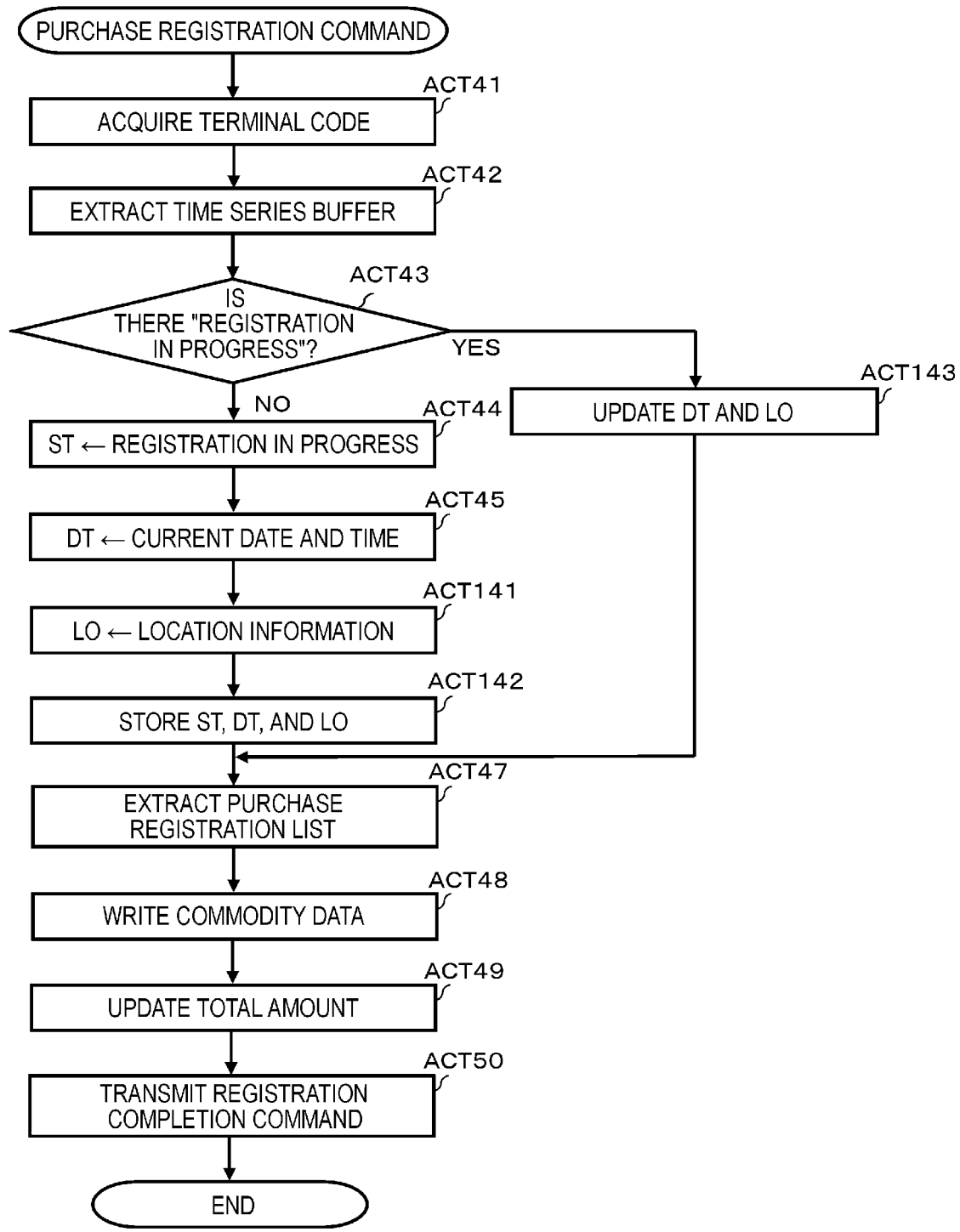
FIG. 26 is a flowchart showing a control procedure of a processor in a virtual POS server.

If the processor 21 of the virtual POS server 20 receives the purchase registration command from the mobile terminal 70 via the communication interface 25, the processor 21 starts the command reception process of the procedure shown in the flowchart of FIG. 26.

In the second embodiment, the processes of ACT 141 and ACT 142 are performed after the process of ACT 45.

The processor 21 acquires the location information LO from the purchase registration command by the function of the fourth acquisition unit 214, as ACT 141. Then, the processor 21 describes the status ST, the current date and time DT, and the location information LO in association with the time series buffer 231 extracted by the process of ACT 42, as ACT 142.

In the second embodiment, if the processor 21 determines YES in ACT 43, the processor 21 proceeds to ACT 143.

The processor 21 updates the current date and time DT and the location information LO on the same line in which "registration in progress" is described as the status ST to the newly acquired current date and time DT and location information LO, as ACT 143. Then, the processor 21 proceeds to ACT 47.

Refer back to the description of FIG. 23. The processes of ACT 11, ACT 13, and ACT 14 are the same as those of the first embodiment. The processor 71 controls the wireless unit 76 to transmit the checkout execution command to the virtual POS server 20, as ACT 121 in FIG. 24. Therefore, the wireless unit 76 wirelessly transmits the checkout execution command. The checkout execution command is received by the access point 60 and sent to the virtual POS server 20 via the network 2. The checkout execution command includes the terminal code stored in the built-in memory 72 and the location information. The location information is the location of the mobile terminal 70 at the start of transmission of the checkout execution command, which is positioned by the GPS sensor 77.

Figure 27:
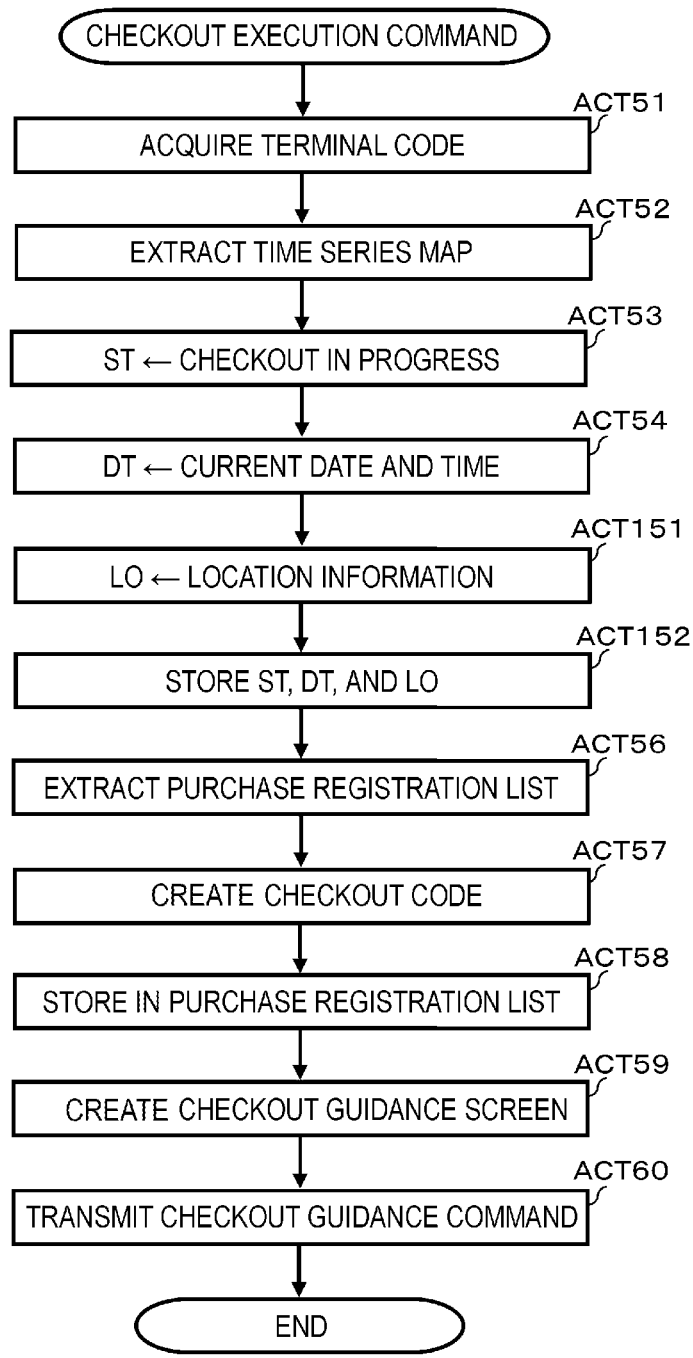
FIG. 27 is a flowchart showing a control procedure of a processor in a virtual POS server.
Figure 28:
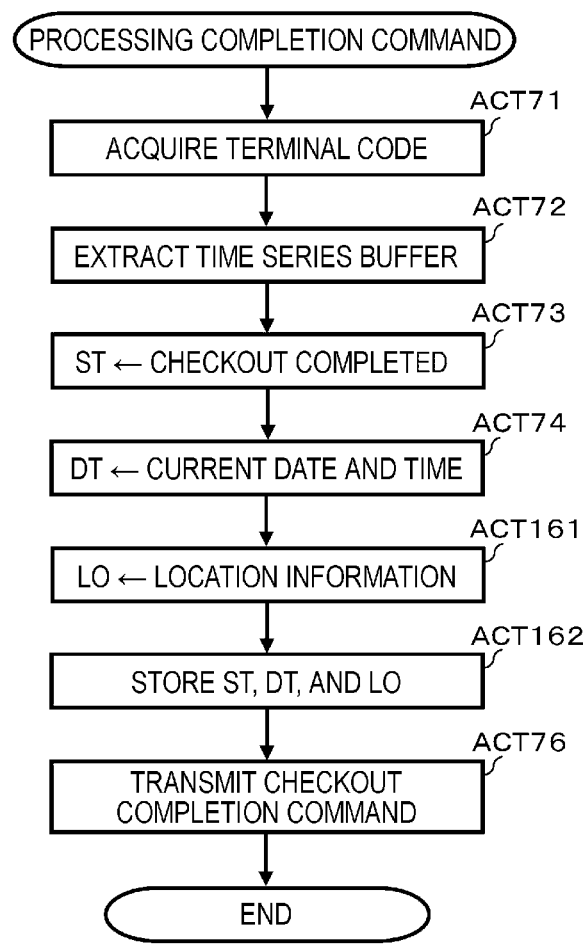
FIG. 28 is a flowchart showing a control procedure of a processor in a virtual POS server.

If the processor 21 of the virtual POS server 20 receives the checkout execution command from the mobile terminal 70 via the communication interface 25, the processor 21 starts the command reception process of the procedure shown in the flowchart of FIG. 27.

In the second embodiment, the processes of ACT 151 and ACT 152 are performed after the process of ACT 54.

The processor 21 acquires the location information LO from the checkout execution command by the function of the fourth acquisition unit 214, as ACT 151. Then, the processor 21 describes the current date and time DT, the status ST, and the location information LO in association with each other in the time series buffer 231 extracted by the process of ACT 52, as ACT 152.

Refer back to the description of FIG. 24. The processes of ACT 22 and ACT 23 are the same as those of the first embodiment. If the processor 21 of the virtual POS server 20 receives the processing completion command from the checkout machine 40 via the communication interface 25, the processor 21 starts the command reception process of the procedure shown in the flowchart of FIG. 28.

In the second embodiment, the processes of ACT 161 and ACT 162 are performed after the process of ACT 74.

The processor 21 acquires the location information LO by the function of the fourth acquisition unit 214, as ACT 161. Specifically, the processor 21 detects that "checkout in progress" is described in the time series buffer 231 as the status ST on the same date as the current date and time DT acquired by the process of ACT 74 and before the current date and time DT. Then, the processor 21 acquires the location information LO of the same line in which the "checkout in progress" is described. In the second embodiment, it is assumed that the location information of the mobile terminal 70 is the same at the time when "checkout in progress" is described as the status ST and when "checkout completed" is described as the status ST. Then, the processor 21 describes the current date and time DT, the status ST, and the location information LO in association with each other in the time series buffer 231 extracted by the process of ACT 72, as ACT 162.

Refer back to the description of FIG. 24. The processes of ACT 24 to ACT 27 are the same as those of the first embodiment. The processor 71 controls the wireless unit 76 to transmit the store exit command to the virtual POS server 20, as ACT 122. Therefore, the wireless unit 76 wirelessly transmits the store exit command. The store exit command is received by the access point 60 and sent to the virtual POS server 20 via the network 2. The store exit command includes the terminal code and location information. The location information is the location of the mobile terminal 70 at the start of transmission of the store exit command, which is positioned by the GPS sensor 77.

Figure 29:
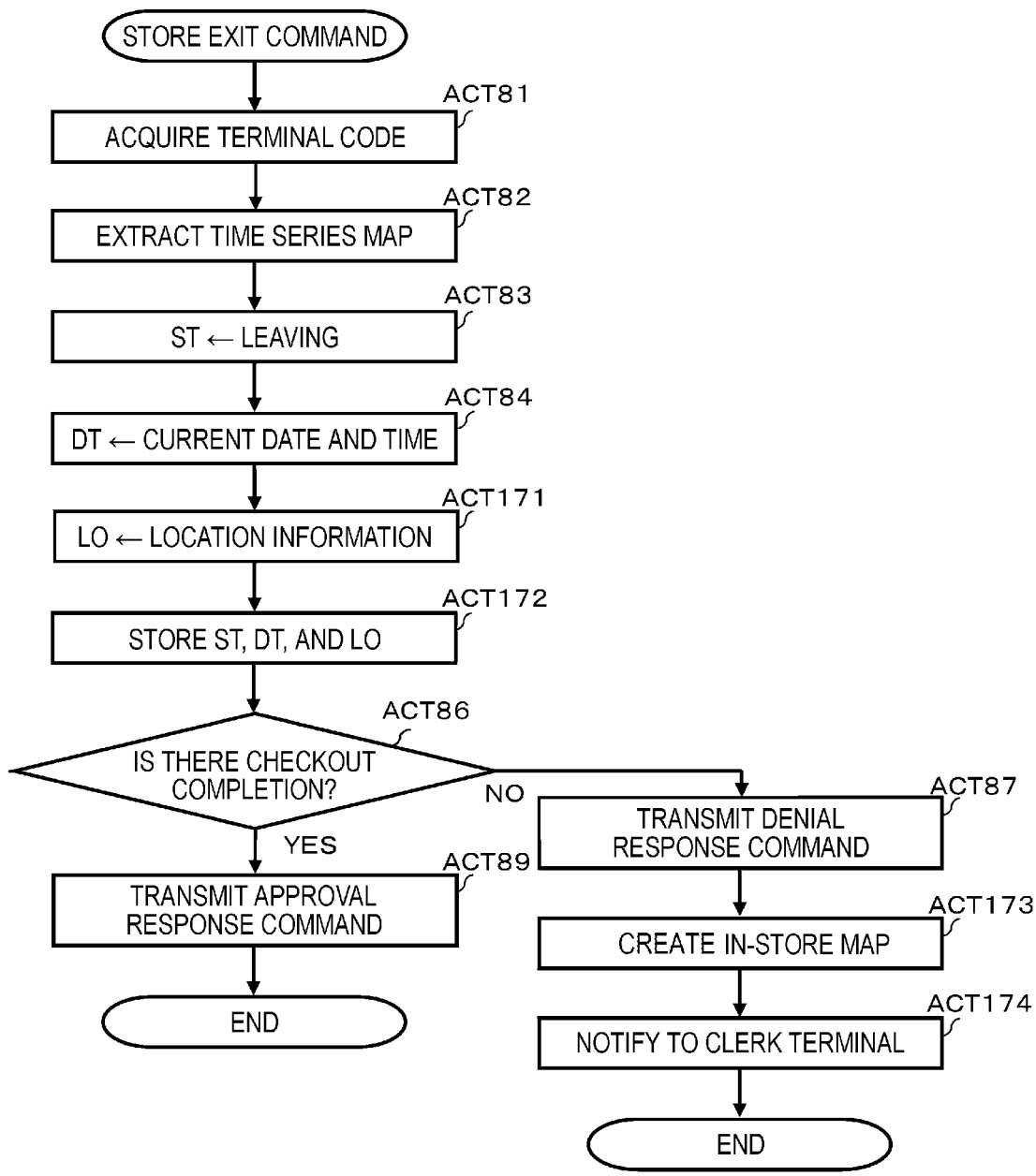
FIG. 29 is a flowchart showing a control procedure of a processor in a virtual POS server.
Figure 30:
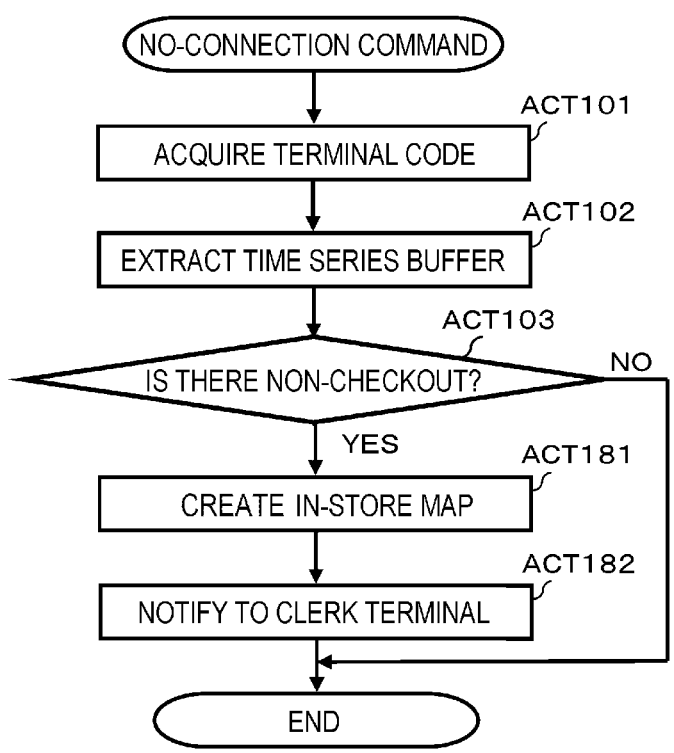
FIG. 30 is a flowchart showing a control procedure of a processor in a virtual POS server.

If the processor 21 of the virtual POS server 20 receives the store exit command from the mobile terminal 70 via the communication interface 25, the processor 21 starts the command reception process of the procedure shown in the flowchart of FIG. 29.

In the second embodiment, the processes of ACT 171 and ACT 172 are performed after the process of ACT 84.

The processor 21 acquires the location information LO from the store exit command by the function of the fourth acquisition unit 214, as ACT 171. Then, the processor 21 describes the current date and time DT, the status ST, and the location information LO in association with each other in the time series buffer 231 extracted by the process of ACT 82, as ACT 172.

In the second embodiment, the processes of ACT 173 and ACT 174 are performed after the process of ACT 87.

The processor 21 creates an in-store map based on the current date and time DT and the location information LO described in the time series buffer 231 in the process of ACT 172, and the map database 331, as ACT 173. The processor 21 creates, for example, an in-store map showing the location of the mobile terminal 70 at the start of transmission of the store exit command.

The processor 21 controls the communication interface 25 to transmit the second notification command to the clerk terminal 50, as ACT 174. Therefore, the second notification command is transmitted via the communication interface 25. The second notification command is received by the clerk terminal 50 via the network 2. The second notification command includes the terminal code acquired by the process of ACT 81 and the image data of the in-store map created by the process of ACT 173.

The clerk terminal 50 that received the second notification command displays the second warning screen 200 (see FIG. 32) with the in-store map on the touch panel.

Figure 32:
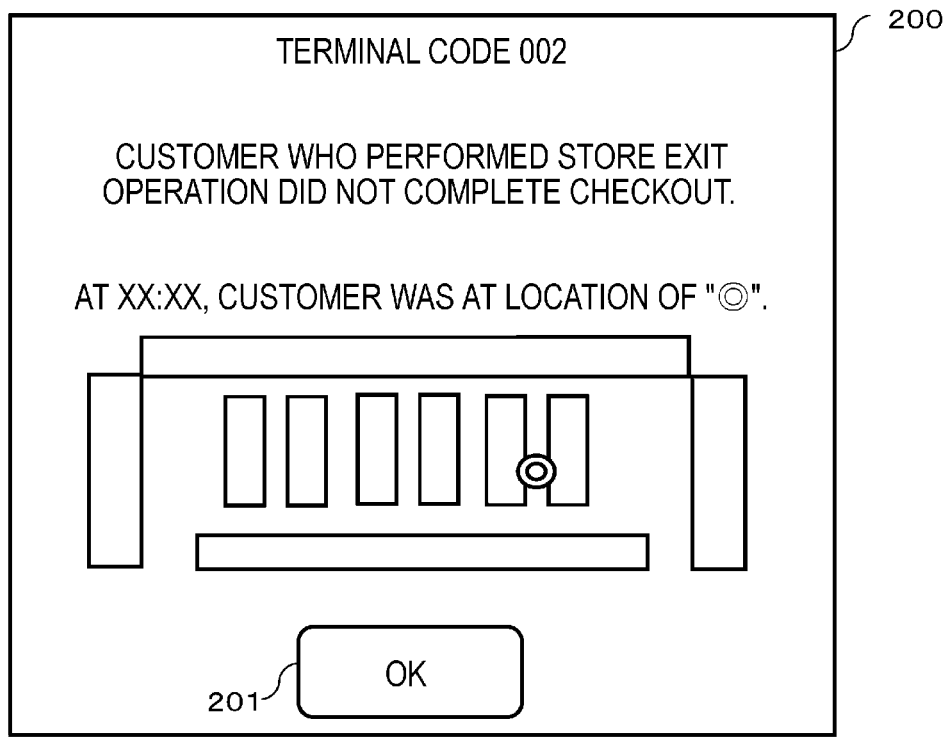
FIG. 32 is a diagram showing an example of a second warning screen with an in-store map.

FIG. 32 is a schematic diagram showing an example of the second warning screen 200 with an in-store map. As can be seen by comparing FIGS. 20 and 32, in the second embodiment, the store map, the image of the mark M indicating the location of the mobile terminal 70, and text data notifying the time when the mobile terminal 70 was at the location are further displayed on the second warning screen 200. The contents of the text data and the image displayed in FIG. 32 are examples.

By the way, as in the first embodiment, in the second embodiment, if the processor 21 of the virtual POS server 20 receives the no-connection command from the management server 30 via the communication interface 25 by the function of the third acquisition unit 213. The processor 21 starts the command reception process of the procedure shown in the flowchart of FIG. 30.

The processes of ACT 101 to ACT 103 are the same as those of the first embodiment. The processor 21 creates an in-store map based on the current date and time DT and the location information LO described in the last line of the time series buffer 231, and the map database 331, as ACT 181. The processor 21 creates an in-store map indicating, for example, the location of the mobile terminal 70 at the time when the status ST of the time series buffer 231 identified by the terminal code in which "not connected" is described as the communication connection state in the connection management table 321 is last described.

The processor 21 controls the communication interface 25 to transmit the third notification command to the clerk terminal 50 by the function of the output unit 215, as ACT 182. Therefore, the third notification command is transmitted via the communication interface 25. The third notification command is received by the clerk terminal 50 via the network 2. The third notification command includes the terminal code of the time-series buffer 231 acquired by the process of ACT 101 and the image data of the in-store map created by the process of ACT 181.

The clerk terminal 50 that received the third notification command displays the third warning screen 300 (see FIG. 33) with an in-store map on the touch panel.

Figure 33:
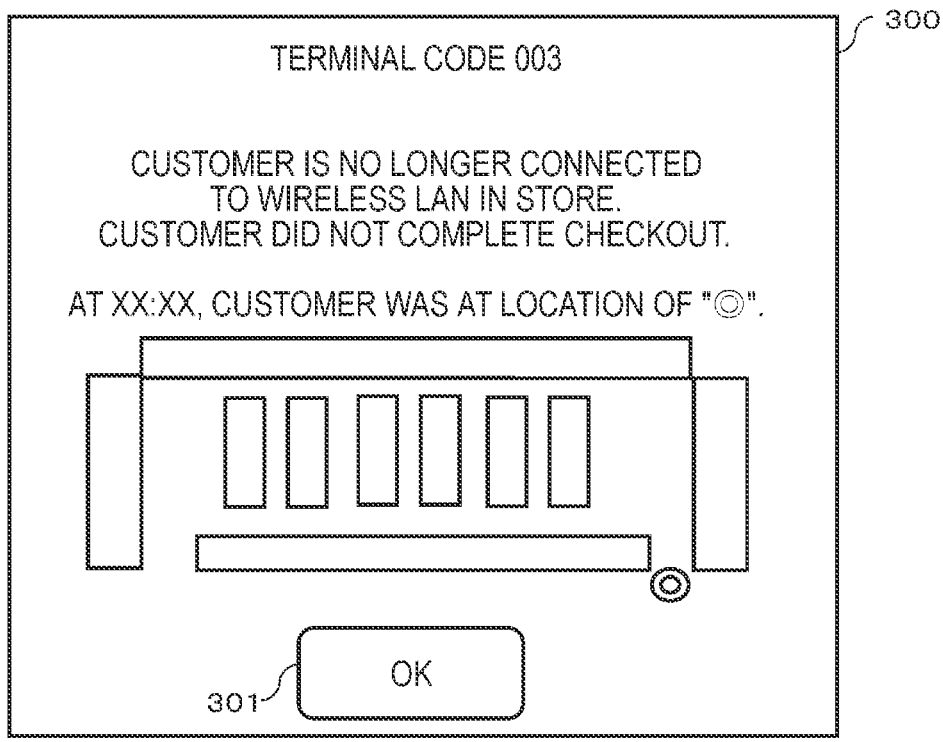
FIG. 33 is a diagram showing an example of a third warning screen with an in-store map.

FIG. 33 is a schematic diagram showing an example of the third warning screen 300 with an in-store map. As can be seen by comparing FIGS. 21 and 33, in the second embodiment, the in-store map, the image of the mark M indicating the location of the mobile terminal 70, and text data notifying of the time when the mobile terminal 70 was at the location are further displayed on the third warning screen 300. The contents of the text data and the image displayed in FIG. 33 are examples.

As described above, in the second embodiment, the location information LO of the mobile terminal 70 at the time when "entering", "registration in progress", "checkout in progress", "checkout completed", and "leaving" are acquired as the status ST is acquired. If the no-connection command is received from the management server 30 to the virtual POS server 20, the terminal code of the mobile terminal 70 that is no longer connected to the wireless LAN in the store is acquired. If data indicating the current non-checkout is described in the time-series buffer 231 identified by the terminal code, the third notification command including the terminal code and the image data of the in-store map is output to the clerk terminal 50. Then, on the clerk terminal 50, the third warning screen 300 with an in-store map is displayed. On the in-store map, the location of the mobile terminal 70 at the time when the status ST of the mobile terminal 70 that is no longer connected to the wireless LAN in the store is last described is displayed. Therefore, the clerk can efficiently search for the user who owns the mobile terminal 70 based on the location of the mobile terminal 70 displayed on the in-store map.

The first embodiment and the second embodiment were described above, but the embodiment is not limited thereto.

In the above embodiments, it is illustrated that the data code for entering the store and the data code for exiting the store are coded by a predetermined two-dimensional code system. For example, the data code for entering the store and the data code for exiting the store may be a one-dimensional code system depending on the amount of information included in a medium.

In the above embodiment, if the user reads the data code for entering the store prepared at the entrance of the store with the camera 75, the status ST is set to "entering", assuming that the store entry operation was performed. If the user reads the data code for exiting the store prepared at the exit of the store with the camera 75, the status ST is set to "leaving", assuming that the store exit operation was performed. Even when entering or leaving the store without reading the data code for entering the store or the data code for exiting the store, the status ST may be set to "entering" or "leaving". For example, there are gate devices at the entrance and exit of a store. The gate device includes a pass sensor that detects that the customer passed through the gate device and a reader that reads the terminal code of the mobile terminal 70. For example, a customer passes through a gate device in the direction of entering the store. If the terminal code of the mobile terminal 70 owned by the customer is read by the reader, the status ST may be set to "entering", assuming that the store entry operation was performed. For example, a customer passes through a gate device in the direction of leaving the store. If the terminal code of the mobile terminal 70 owned by the customer is read by the reader, the status ST may be set to "leaving", assuming that the store exit operation was performed.

In the above embodiment, it is illustrated that the history error screen and the non-checkout screen are displayed on the touch panel 74 of the mobile terminal 70. For example, a voice message indicating that a history error occurred and that the checkout was not performed may be output. In the first embodiment, it is illustrated that the first warning screen 100, the second warning screen 200, and the third warning screen 300 are displayed on the touch panel of the clerk terminal 50. In the second embodiment, it is illustrated that the first warning screen 100, the second warning screen 200, and the third warning screen 300 with an in-store map are displayed on the touch panel of the clerk terminal 50. For example, a voice message may be used to issue a warning.

In the above embodiment, the management server 30 is illustrated to be connected to the network 2. For example, the management server 30 may be provided on the Internet as cloud computing.

In the above embodiment, the management server 30 is illustrated to form the map database 331 in a part of the storage area of the auxiliary storage device 33. The map database 331 does not need to be possessed by the management server 30. For example, a map search service on the Internet capable of data communication with the management server 30 may be used.

In the above embodiment, the virtual POS server 20 was described as one aspect of the sales management device. For example, a virtual POS server 20 further having a function as at least one of the store server 10 or the management server 30 may be used as the sales management device. In other words, the store server 10 or the management server 30 having the function as the virtual POS server 20 may be used as the sales management device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sales management device comprising:
   a communications interface configured to communicate over a network with a mobile terminal on which a user performs an action including registering commodities within a store for purchase and with a clerk terminal within the store, wherein the mobile terminal wirelessly communicates with the network; and a processor configured to:
acquire terminal identification information set for the mobile terminal;
acquire status information indicating an operating status of the mobile terminal identified by the terminal identification information;
acquire a wireless communication connection state of the mobile terminal with the network while the mobile terminal is within the store;
output the terminal identification information to the clerk terminal in response to (i) the wireless communication connection state of the mobile terminal being unconnected and (ii) the status information of the mobile terminal acquired before the wireless communication connection state of the mobile terminal becoming unconnected indicating a non-checkout status;
store a history relating to the mobile terminal within the store; and
provide a store entry error notification to the clerk terminal in response to (i) the mobile terminal attempting to subsequently connect to the network upon entry of the store at a later time and (ii) the history indicating that the non-checkout status has not been resolved.

2. The sales management device of claim 1, wherein the processor is configured to acquire location information of the mobile terminal regarding a location of the mobile terminal within the store.

3. The sales management device of claim 2, wherein the processor is configured to output the terminal identification information and the location information to the clerk terminal in response to (i) the wireless communication connection state of the mobile terminal being unconnected and (ii) the status information of the mobile terminal acquired before the wireless communication connection state of the mobile terminal becoming unconnected indicating the non-checkout status.

4. The sales management device of claim 3, wherein the processor is configured to output a map showing the location of the mobile terminal within the store to the clerk terminal.

5. A sales management method comprising:
acquiring, by a processor, terminal identification information over a network from a mobile terminal on which a user performs an action including registering commodities within a store for purchase, wherein the mobile terminal wirelessly communicates with the network;
acquiring, by the processor, status information indicating an operating state of the mobile terminal identified by the terminal identification information;
acquiring, by the processor, a wireless communication connection state of the mobile terminal with the network while the mobile terminal is within the store;
outputting, by the processor, the terminal identification information to a clerk terminal in response to (i) a wireless communication connection state of the mobile terminal being unconnected and (ii) the status information of the mobile terminal acquired before the wireless communication connection state of the mobile terminal becoming unconnected indicating a non-checkout status;

storing, by the processor, a history relating to the mobile terminal within the store; and
providing, by the processor, a store entry error notification to the clerk terminal in response to (i) the mobile terminal attempting to subsequently connect to the network upon entry of the store at a later time and (ii) the history indicating that the non-checkout status has not been resolved.

6. The sales management method of claim 5, further comprising, acquiring by the processor, location information of the mobile terminal regarding a location of the mobile terminal within the store.

7. The sales management method of claim 6, further comprising outputting, by the processor, the terminal identification information and the location information to the clerk terminal in response to (i) the wireless communication connection state of the mobile terminal being unconnected and (ii) the status information of the mobile terminal acquired before the wireless communication connection state of the mobile terminal becoming unconnected indicating the non-checkout status.

8. The sales management method of claim 7, further comprising outputting, by processor, a map showing the location of the mobile terminal within the store to the clerk terminal.

9. A sales management system for a store, the sales management system comprising:
a mobile terminal on which a user performs an action including registering commodities within a store for purchase, the mobile terminal including a wireless communications interface;
a clerk terminal within the store; and
one or more servers configured to communicate with the clerk terminal and the mobile terminal over a network, the one or more servers configured to:
monitor a wireless communication connection state of the wireless communications interface of the mobile terminal with the network while the mobile terminal is within the store, the wireless communication connection state including a connected state or an unconnected state;
acquire terminal identification information for the mobile terminal at or after introduction of the mobile terminal into the store;
determine the wireless communication connection state of the mobile terminal is the connected state in response to the one or more servers being able to wirelessly communicate with the mobile terminal over the network;
wirelessly acquire commodity data from the mobile terminal over the network during the connected state regarding the commodities selected to be purchased;
generate a purchase registration list based on the commodity data of the commodities selected to be purchased;
detect the wireless communication connection state of the mobile terminal is the unconnected state in response to the one or more servers being unable to wirelessly communicate with the mobile terminal over the network;
provide a disconnected notification to the clerk terminal in response to the wireless communication connection state being the unconnected state and a checkout procedure regarding the purchase registration list not being completed;
store a history of the mobile terminal within the store; and provide a store entry error notification to the clerk terminal in response to (i) the mobile terminal attempting to subsequently connect to the one or more servers upon entry of the store at a later time and (ii) the history indicating that the disconnect notification has not been resolved.

10. The sales management system of claim 9, wherein the disconnected notification includes the terminal identification information for the mobile terminal and a warning message that a user of the mobile terminal did not complete the checkout procedure and mobile terminal is not connected to the one or more servers.

11. The sales management system of claim 10, wherein the one or more servers are configured to monitor a location of the mobile terminal within the store.

12. The sales management system of claim 11, wherein the disconnected notification includes a map of the store and a last known location of the mobile terminal within the store.

13. The sales management system of claim 9, wherein the one or more servers include a first server that monitors the wireless communication connection state of the mobile terminal and a second server that manages the purchase registration list and the checkout procedure.

14. The sales management system of claim 9, wherein the clerk terminal is configured to display a warning screen in response to acquiring the disconnected notification.

15. The sales management system of claim 14, wherein the one or more servers are configured to monitor a location of the mobile terminal within the store, and wherein the clerk terminal is configured to display a map showing a last known location of the mobile terminal within the store on the warning screen based on the location of the mobile terminal prior to the wireless communication connection state of the mobile terminal being the unconnected state.

16. The sales management method of claim 5, further comprising displaying, by the clerk terminal, a warning screen in response to the non-checkout status.

17. The sales management method of claim 16, further comprising:
  monitoring, by the processor, a location of the mobile terminal within the store; and
  displaying, by the clerk terminal, a map showing a last known location of the mobile terminal within the store on the warning screen based on the location of the mobile terminal prior to the wireless communication connection state of the mobile terminal being the unconnected state.

* * * * *